United States Patent [19]

Habitzreiter et al.

[11] Patent Number: 4,637,059
[45] Date of Patent: Jan. 13, 1987

[54] VIDEO FILTER FOR VIDEO FORMAT UNIT

[75] Inventors: Richard K. Habitzreiter, Dallas; Robert V. Pinney, Jr., Fort Worth; Tony C. Thomas, Flower Mound, all of Tex.

[73] Assignee: Recognition Equipment Incorporated, Irving, Tex.

[21] Appl. No.: 640,346

[22] Filed: Aug. 13, 1984

[51] Int. Cl.$^4$ .............................................. G06K 9/00
[52] U.S. Cl. .................................................... 382/54
[58] Field of Search ................. 382/50, 52, 54, 56; 358/263, 282, 284; 333/165, 166

[56] References Cited

U.S. PATENT DOCUMENTS

| | | | |
|---|---|---|---|
| 3,502,806 | 3/1970 | Townsend | 358/261 |
| 4,020,463 | 4/1977 | Himmel | 382/56 |
| 4,145,686 | 3/1979 | McMurray, et al. | 340/347 DD |
| 4,532,651 | 7/1985 | Pennebaker, Jr. et al. | 382/54 |

Primary Examiner—Stephen A. Kreitman
Attorney, Agent, or Firm—Richards, Harris, Medlock & Andrews

[57] ABSTRACT

A video filter is provided for use in an image processing system wherein correlated video data is received by the video filter in a cellular format. The filter includes structure for simultaneously filtering at least four cells of the correlated video data.

3 Claims, 14 Drawing Figures

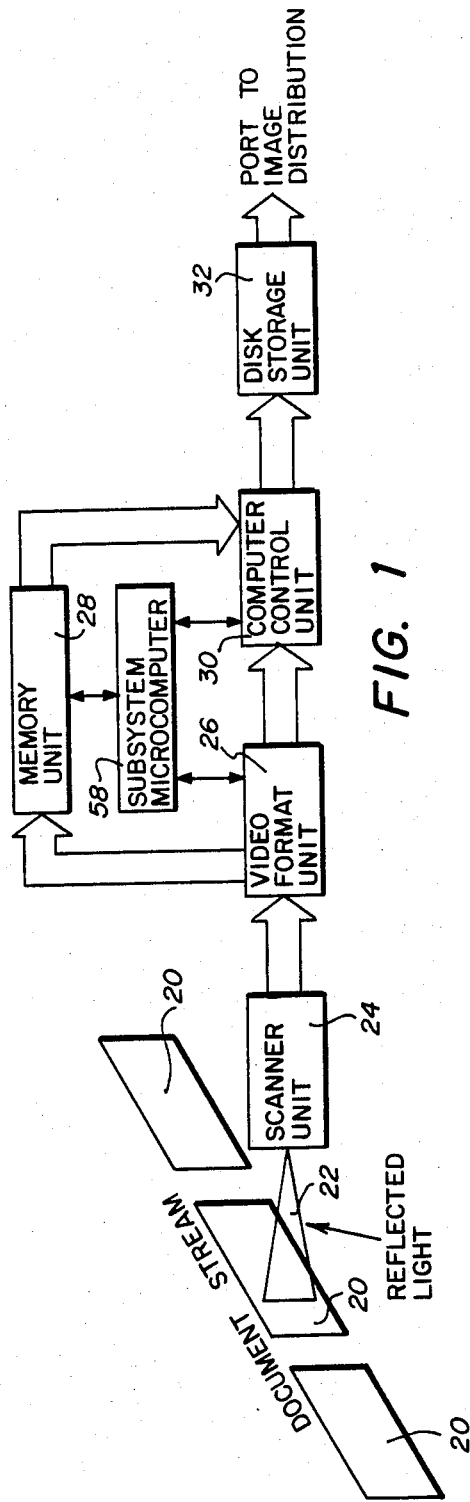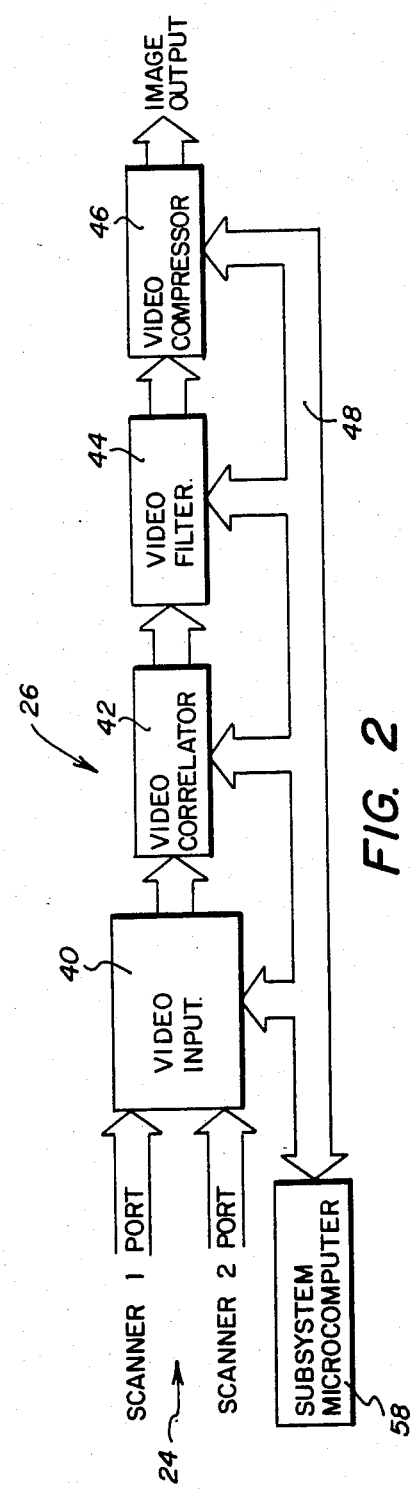

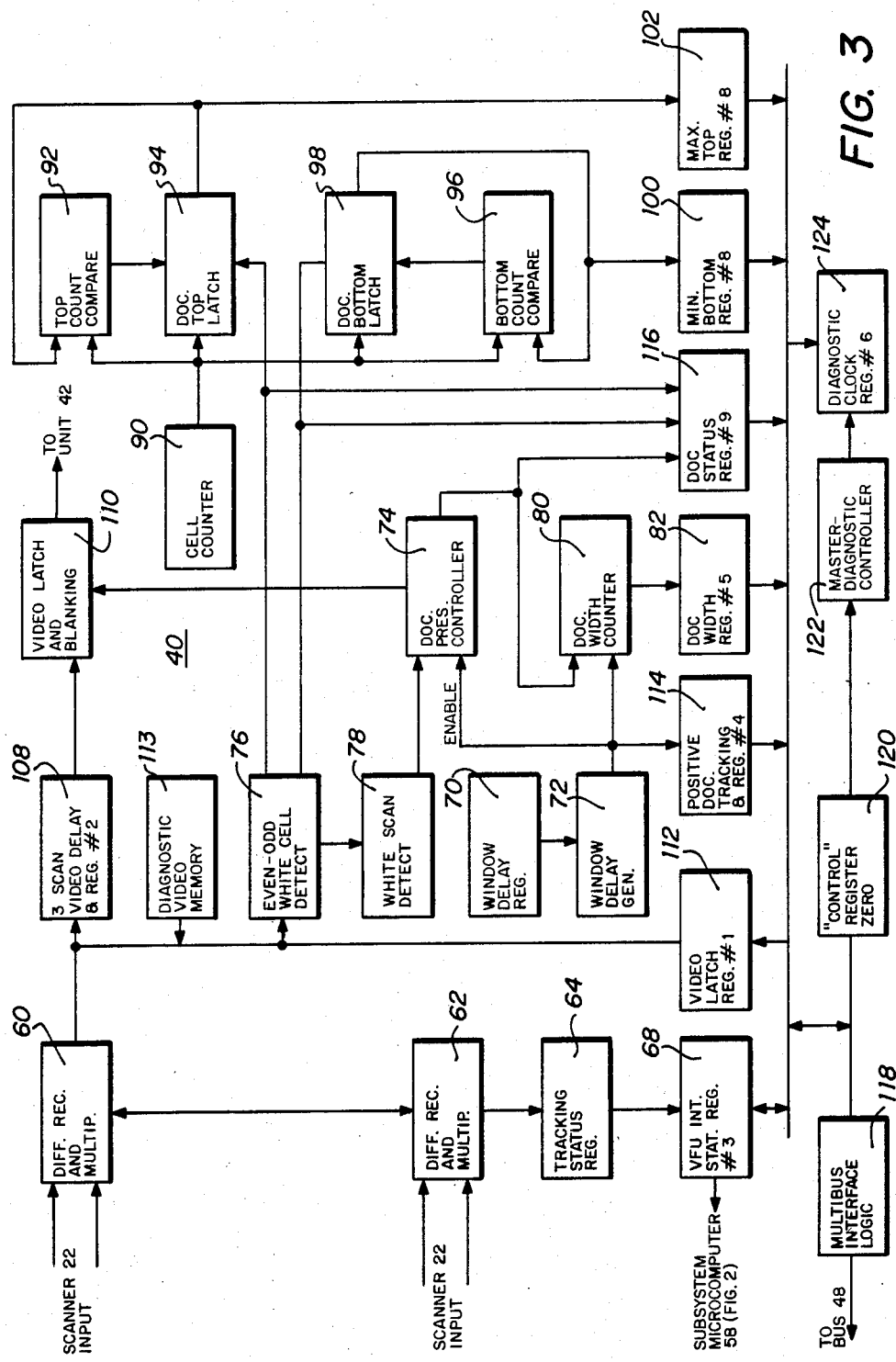

VIDEO FILTER FOR VIDEO FORMAT UNIT

TECHNICAL FIELD

This invention relates to image processing systems, and more particularly to a video filter for a video format unit for use in an image processing system.

BACKGROUND OF THE INVENTION

Document processing systems optically read information from documents, which information may be stored if not used immediately for processing. Numerous systems may lift portions of the document in order to retain certain fields of information on the document, and the document may also be filmed with a microfilm camera at high speed to retain a copy of the entire document. To optically read and digitally store an image of a document generally requires a very large storage capacity with high speed document processors.

High speed processing of imaged data has principally included processing and compression of video data for use in facsimile transmission. In facsimile systems there is no need for long term storage of images as the document is reproduced as the information representative thereof is transmitted. In order to reduce the time to transmit such documents, various coding methods have been performed on the information. Such codes, referred to as run length coding, are used to compress the information; however, when it is desirable to run documents and capture images at rates up to 2000 documents per minute, it is necessary to temporarily store the information and rapidly code this information prior to storage on disks. Previously developed systems have not had sufficient capability for processing and storing images at such high speeds.

Image processing systems also require that the storage of the image be accomplished efficiently. Therefore, numerous data compression devices for compressing the original image pattern for storage and later retrieval by a decompression technique have been proposed. One such compression system is shown in U.S. Pat. No. 4,020,463 issued to D. P. Himmel on Apr. 26, 1977 and entitled "Apparatus and a Method for Storage and Retrieval of Image Patterns". A further data compressor system is shown in U.S. Pat. No. 4,145,686 issued to R. D. McMurray, et al. on Mar. 20, 1979 and entitled "Data Compressor". An apparatus utilizing a run length encoding method is shown in U.S. Pat. No. 3,502,806 issued to S. E. Townsend on Mar. 24, 1970 and entitled "Modified Run Length Data Reduction System".

Image processing systems also require the capability for diagnostic analysis of various portions or subsystems of the image processing system.

A need has thus arisen for a high speed image processing system which includes a video format unit for providing formatting of images for ultimate storage. In such a system, the images prior to being stored require video enhancement as well as compression to obtain optimum storage capability. A need has further arisen for an image processing system in which diagnostics on the video format unit can be effectively and efficiently accomplished.

SUMMARY OF THE INVENTION

In accordance with the present invention, a video filter for a video format unit of an image processing system is provided.

In accordance with the present invention, a video filter for use in an image processing system wherein correlated video data is received by the video filter in a cellular format is provided. The filter includes structure for simultaneously filtering at least four cells of the correlated video data.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 is a functional block diagram of an image processing system utilizing the video format unit of the present invention;

FIG. 2 is a functional block diagram of the present video format unit;

FIG. 3 is a detailed block diagram of the video input unit shown in FIG. 2;

DETAILED DESCRIPTION

Figure 4:
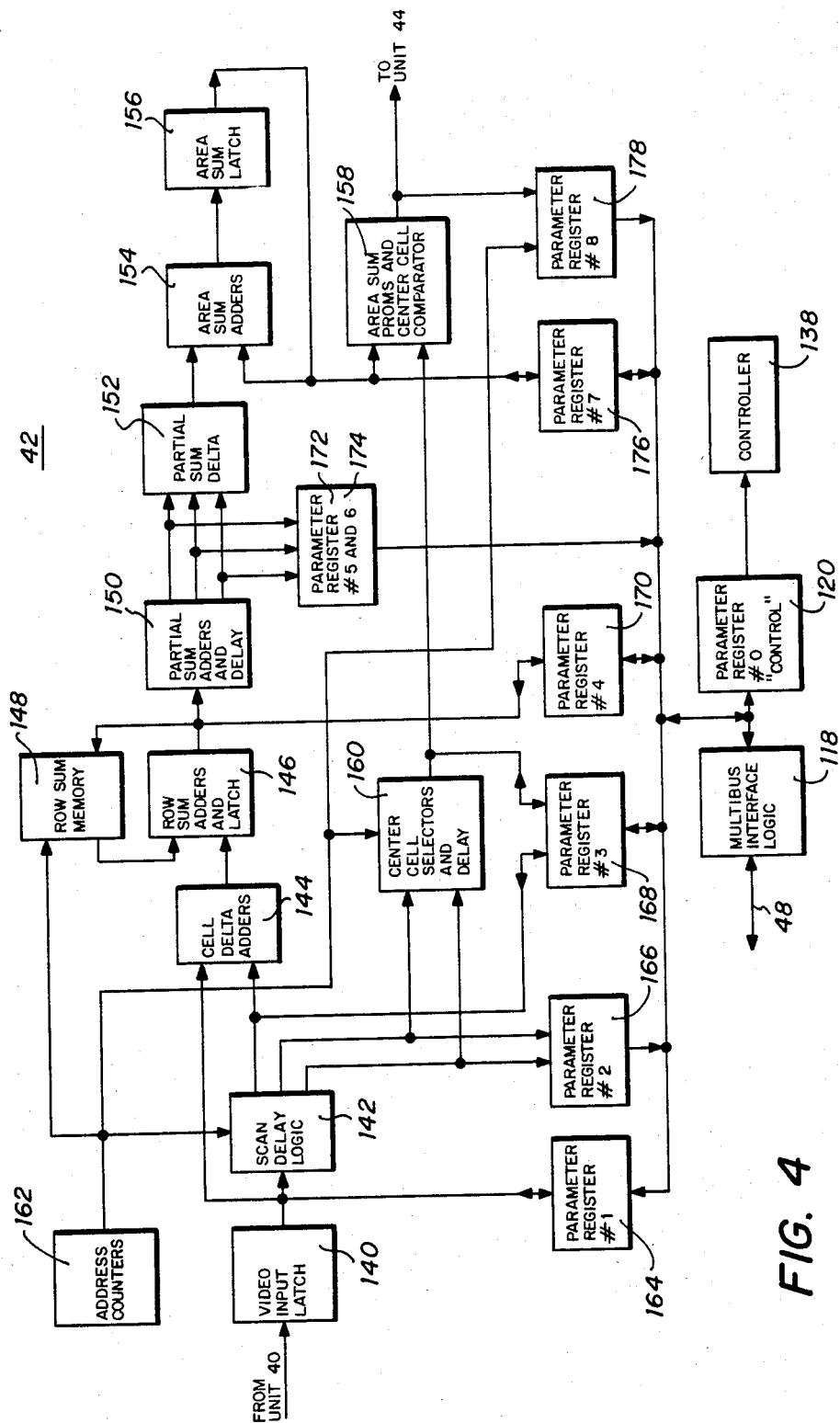
FIG. 4 is a functional block diagram of the video correlator unit shown in FIG. 2.

Referring to FIG. 1, a block diagram of a video processing system is illustrated for use with the present video format unit. The image processing system lifts or captures the full face images of documents 20 using reflected light 22 generated by a scanner unit 24. Documents 20 are reviewed by scanner unit 24 at a rate of, for example, 400 inches per second and at a document throughput rate of up to, for example, 2000 documents per minute. Scanner unit 24 may include, for example, a CCD self-scanned array.

Scanner unit 24 responds to reflected light 22 in the visible spectrum. Each sample point provides a signal proportional to the reflectivity of the document at such point. Scanning unit 24 may provide resolution of 100 points per inch and may include electronic filtering to suppress broad backgrounds while enhancing short-spacial-duration reflectivity changes that are characteristics of printed and handwritten information.

The output of scanner unit 24 is raw video data in the form of shades of gray which is applied to a video format unit 26. Video format unit 26 functions to process the video scan data to construct an enhanced black/white image of the subject document, correlate the raw video data to a single bit per picture element, filter the correlated data and then compress the filtered data to conserve storage disk space. The output of video format unit 26 is applied to a memory unit 28. Access to memory unit 28 is supplied by a computer control unit 30 which performs synchronization for the entire image processing system including, for example, subsequent processing of documents 20 including subsequent reading, encoding, microfilming and printing. An output of computer control unit 30 is applied to a disk storage unit 32 for subsequent output to ports of image distribution for use in other operations associated with the image processing system. These other ports include, for example, display screens for operator use, printers and data correction entry systems.

Referring simultaneously to FIGS. 1 and 2, video format unit 26 (FIG. 1) is illustrated in block diagram form. The output of scanner unit 24 is applied to either one of two ports of a video input unit 40. Video format unit 26 operates with two input ports to video input unit 40 to provide redundancy in operation. Video input unit 40 accepts variable data rates up to, for example, 46 nanoseconds per picture element and processes documents at 30 millisecond intervals. In order to accomplish these rates, video input unit 40 operates on two documents 20 (FIG. 1) at a time. While video input unit 40 is receiving one document, it is calculating parameters on a previously received document including extraction of information for subsequent transmission through video format unit 26.

Video input unit 40 further functions to locate the document and the image portion of a document. The top and bottom of the document are measured and an information window is determined such as, for example, a 3-inch by 6-inch window for commercial bank checks.

The output of video input unit 40 is applied to a video correlator unit 42 which is a high speed correlator. Generally, video correlator unit 42 compares one cell of the video image to neighboring cells to determine if the cell should be black or white. The decision is based upon a comparison of the cell's gray level with the average gray level of the cells in a 5-by-5 or 7-by-7 cell area surrounding the cell in question. If the center cell is darker than the area sum average, then it is correlated black. If the center cell is lighter than the area sum average, then it is correlated white. Video correlator 42 correlates data utilizing correlation curves such that a darker curve permits center cells which are slightly lighter than the area sum average to correlate black, while a lighter curve requires the center cell to be darker than the area sum average to correlate black. Video correlator 42 operates on two cells at a time as opposed to previously developed systems which operate in a serial fashion analyzing each cell individually in a serial bit string. Since two cells are analyzed simultaneously, video correlator 42 creates two row sums and two area sums simultaneously.

The correlated video data from video correlator unit 42 is applied to a video filter unit 44. Video filter unit 44 functions to filter the correlated video data by determining whether there is a minimum density of black or white cells in a particular area. For example, if the center cell of a nine cell neighborhood is white and is completely surrounded by black cells, the video filter unit 44 converts the white cell to a black cell. An important aspect of video filtering unit 44 is that it operates by filtering four cells at a time to be compatable with video correlator unit 42 which correlates two cells simultaneously.

Video filter unit 44 also includes a memory unit for storing the image of the entire document 20 (FIG. 1). Since the entire document is being read, and it is not known initially the size of the document which contains information to be read, video filter unit 44 stores data until video input unit 40 has calculated the size of the window containing data to be read on document 20. Video filter unit 44 contains two memory sections, one for capturing the current document data as it is being read and a second memory for storing the desired extracted data from the document that previously was read. The captured and filtered data is then output to a video compressor unit 46.

Video compressor unit 46 receives four bits of correlated video from video filter unit 44 and compresses this data to a continuous 16-bit field. Compression is achieved by counting the number of times the data pattern repeats itself, then storing the data pattern and the repeat count. The data pattern is stored as a 4-bit field, while the repeat count is stored as a variable length field (1 to 15 bits). The pattern-repeat count sets are merged together in consecutive 16-bit words. The present video compressor 46 results in a compression ratio of 4 to 1 and, depending upon the type of data, can result in a compression ratio of 50 to 1 for constant patterns and 4 to 5 for alternating patterns. The output of video compressor unit 46 is applied through computer control unit 30 to the image processing system's global memory such as disk storage unit 32.

Video compressor unit 46 operates at high speed throughput by separating the compressor input segment repeat count generator and the coder. The segment repeat count generator examines each 4 picture element input. If the new input is the same pattern as the previous input, the repeat counter is incremented. If the new input is different, the old pattern and its repeat count are written into a segment memory, and the new pattern becomes the next clock's old pattern and the repeat pattern is cleared. Two segment memories are utilized to increase throughput.

Video compressor unit 46 operates in a parallel mode generating the coded pattern which is the video itself plus a variable number of bits which is a count of the total number of bits that the pattern has repeated.

Video input unit 40, video correlator unit 42, video filter unit 44 and video compressor unit 46 are interconnected by a multi-bus 48 to a subsystem microcomputer 58. Subsystem microcomputer 58 is also interconnected to memory unit 28 and computer control unit 30 (FIG. 1). Subsystem microcomputer 58 and multi-bus 48 allow independent diagnostic testing of each of the units of video format unit 26. Subsystem microcomputer 58 can independently operate each of the units within video format unit 26 for performing diagnostic testing without requiring operation of the other three units of video format unit 26.

VIDEO FORMAT UNIT—VIDEO INPUT UNIT

FIG. 3 Overview

Referring now to FIG. 3, the video format unit—video input unit 40 (VFUIN) receives video data and document tracking signals from one of the two document transports. The VFUIN unit 40 interrupts the subsystem microcomputer 58 when a document passes before the transport item presence sensor. Unit 40 then waits a specified period of time, and then begins monitoring the video to determine when the document is in front of the data lift optics. When a sufficient number of white cells have been detected, unit 40 sets the document presence signal which in turn enables the video from the selected transport to be sent to the video correlator unit 42. As the document passes before the data lift optics, unit 40 continues to monitor the video to find the document top and bottom. The highest top and lowest bottom are stored in a register to be read by the subsystem microcomputer 58 after the document 20 trailing edge.

Video and document tracking signals are received from two document transports by the differential receivers 60, 62. The subsystem microcomputer 58 sends a port select bit which causes unit 40 to select the signals from one of the two transports.

When a document passes before the selected transport item presence sensor, the tracking status register 64 sends a leading edge interrupt to the subsystem microcomputer 58 via the interrupt status register 68, and increments a counter that keeps track of the total number of documents in a given run. The document counter is initialized prior to the batch run and is read at the leading edge time of each document. The interrupt status register 68 also sends VFUFM 44 and VFUCM 46 interrupts to subsystem microcomputer 58.

The input unit 40 receives item presence from the selected transport when the item passes before the item presence sensor. The window delay register 70 is loaded with a value that represents the distance (in scans) from the sensor to the data lift optics window. This value is loaded into the window delay generator 72 when the item reaches the sensor. The counters then begin counting down each scan until they reach a value of zero. When the counters reach zero the Enable Document Presence bit is sent to the document presence generator logic 74.

The white cell detect logic 76 receives the video from the differential receivers 60, 62. If the even cell has a value less than 13, then the Even White signal is set. This signal is sent to the white scan detect logic 78. When the white cell detect logic 78 detects three consecutive white cells then the top latch enable signal is set to determine a top for that scan. When the white cell detect logic 76 detects three consecutive non-white cells, the bottom latch disable bit is set to indicate a bottom for that scan.

The white scan detect logic 78 receives the Even White signal and the Top Latch Enable signal from the white cell detect logic 76. When the Top Latch Enable occurs, the white scan detect logic 78 begins counting the white cells. If an additional 11 white cells occur in that scan, then the scan is a "white" scan. The white scan indication is sent to the document presence generator logic 74.

The document presence generator 74 begins counting white scans when it receives the Enable Document Presence signal from the window delay logic 72. When three consecutive white scans occur after enable document presence goes high, the Document Presence bit is set. It will remain set until three consecutive non-white scans occur. When document presence occurs, the document width counters 80 begin counting the scan width of the document. This value is read by the subsystem microcomputer 58 after trailing edge from document width register #5, block 82. The Document Presence signal also enables the top and bottom latches 94 and 98 and the video output to the correlator unit 42.

The cell counter 90 counts the clock cycles beginning at begin scan. This count represents the position of the video with respect to the top of the data lift scan window. The scan window is 512 cells (256 clock cycles) from top to bottom. The top count comparator 92 compares the current cell count to the cell count that is stored in the document top latch 94. If a top occurs from logic 76 and the current cell count is less than the count in the register, then the new cell count replaces the old top in the document top latch 94. The value stored in the document top latch 94 is the highest top that has been seen for that document. The document bottom comparator 96 and latch 98 find the lowest bottom for each document. When the document presence signal is removed, the top and bottom for the document are stored in register #8, blocks 100 and 102.

The document presence logic of unit 40 requires three consecutive white scans to generate document presence. In order to keep from losing the video from the first three scans of the document, the video is written into a three scan video delay memory 108. The video from the scan delay memory is latched in video output latch 110 and output to the correlator unit 42 (FIG. 2) when document presence is high. Thus the first scan of video that is sent to the correlator unit 42 is the first white scan of the document. When document presence is inactive, the video output latch 110 is cleared and the correlator unit 42 receives all white video. When the VFUIN unit 40 is in a diagnostic mode, the video from the data lift unit is replaced by diagnostic video from register #1, block 112, or from diagnostic video memory 113, either of which may be loaded and used to feed the remainder of the unit 40.

The subsystem microcomputer 58 controls the operation of the unit 40 and performs diagnostic operations on the unit 40 through the parameter registers 82, 108, 112, 114, 116 and 120. The multibus interface logic 118 decodes the multibus port address to provide read and write signals to the parameter registers. Logic 118 also controls the data bus transceiver enable and direction. Commands to the unit 40 are written to and read from control register zero, block 120. The master diagnostic controller 122 provides diagnostic clock and control signals to the rest of the unit 40 via diagnostic clock register #6, block 124, and selects one of the two data lift inputs based upon the port select command bit.

Detailed Description

FIG. 3

The VFUIN unit 40 receives two 4-bit cells of video per clock cycle from either of two transport data lift units. Each 512 cell scan of video requires 256 clock cycles. A begin scan signal indicates the start of each scan. The leading edge document signal indicates when an item is at the item presence sensor of the transport. Each transport also sends a transport I.D. number that is passed on to the unit microcomputer 58. Video and control signals are received from the two transports by 26LS33 differential receivers 60 and 62. The two port select signals select video and control signals from one of the two transports.

The eight bits of video are latched by latch 110. The latch 110 is disabled when unit 40 is in a diagnostic mode.

The leading edge interrupt counter within Register 64 generates a leading edge interrupt signal when the enable document presence signal from the window delay generator 72 goes high. The leading edge interrupt remains high for one multibus clock cycle. The leading edge interrupt is latched by the tracking status register 64. The tracking status register 64 also latches document complete and memory overflow interrupt from VFUCM unit 46 and write complete interrupt from VFUFM unit 44. When any of the interrupt signals is active, the tracking status register 64 sends an interrupt to the subsystem microcomputer 58. The microcomputer 58 may then read status register #3, block 68, to determine which of the status interrupts has occurred. A write to status register #3, block 68, with the corresponding bit high will cause the interrupt to be reset.

The input unit 40 receives item presence from the selected transport when the item passes before the item presence sensor. The window delay generator register 70 is loaded with a value that represents the distance (in scans) from the sensor to the data lift optics window. This value is loaded into the window delay generator 72 when the item reaches the sensor. The counters then begin counting down each scan until they reach a value of zero. When the counters reach zero the enable document presence bit is sent to the document presence generator logic 74. The window delay register 70 consists of two 74LS374. The window delay generator 72 consists of four 74F163 4-bit counters. Note that the value that is written to register #4, block 114, must be the two's complement of the actual scan delay. The counters are clocked by the begin scan signal. When the counters count to 0FFFF (HEX), the enable document presence signal goes high, which in turn prevents the counter from continuing to count.

The white cell detect 76 receives video from the video input latch of receiver 60. When the even cell (bits 0-3) has a value less than or equal to 12, then the cell is assumed to be white. If the cell is within the valid cell range (cell 0-511), then the detect 76 outputs the even white signal. When three consecutive even white cells occur, the top latch enable signal to latch 94 goes low. When three consecutive black cells occur after a top then the bottom latch disable signal to latch 98 goes high.

The white scan detect logic 78 is a 74F163 counter. This counter begins counting white cells when the first top after begin scan occurs. If an additional eleven white cells are counted for that scan, the scan is determined to be a white scan. The white scan detect logic 78 is controlled by the document presence controller 74.

The document presence controller 74 receives the document tracking control signals from the selected transport and determines document presence.

When a document passes in front of the item presence sensor on the transport, a signal is received by the document presence controller 74. The window delay value (two's complement) is then loaded into the counter 72 which is then enabled to count. The counter 72 will then count the scan delay value and a signal is generated to blocks 74, 80 and 114. Until the document presence controller 74 receives this signal, document presence cannot be generated. When the output of counter 72 is present at the controller 74, a signal from the even/odd white cell detect 76 is monitored. When the controller 74 receives the signal from the white cell detect 78, a signal is generated for each following white cell during the scan. This signal enables the white scan detect logic 78 to count. After eleven additional white cells during the scan, the scan is determined to be a white scan and the document presence controller 74 receives the output of detect 78. Any scan during which the output of detect 78 signal is not present is considered a "black" scan. Three consecutive white scans generate the document presence output of controller 74. This output will remain until three consecutive non-white (black) scans have been detected.

The document presence controller 74 also controls the operation of the three scan delay logic 108. The controller 74 alternately selects between the scan delay memory at each begin scan. The scan delay memories within logic 108 are also disabled by the controller 74 during the invalid video cells sent from the data lift at the end of each scan of video.

The document width counter 80 consists of three 74F163 counters. The counter 80 is cleared by the document present controller 74 before the start of each document. The counter 80 is enabled by the document presence signal from controller 74. The counter 80 counts the scan length of each document. When document presence goes inactive, the scan width is latched into register #5, block 82. The subsystem microcomputer 58 must then read the document width before the end of the next document.

The cell counter 90 is a 74LS590 8-bit counter. The counter 90 is cleared at begin scan and counts from 0 to 255 each scan. When the cell count equals 255, the counter is disabled until the next begin scan. Each scan consists of 512 valid cells (clocks 0 to 255) and 32 invalid cells (clocks 256 to 272). Thus the cell counter 90 is disabled during the invalid cell time.

The document top latch 94 is set to 255 at the beginning of each document. The document top comparator 92 compares the value in the document top latch 94 to the current cell count. If the cell count is less than the value in the latch 94, and if the current cell is determined to be a top, then the current cell count replaces the previous value in the top latch 94. Thus the top latch 94 saves the highest top for each document. Note that any top will replace the initial value of 255. The document bottom latch 98 is cleared to zero at the beginning of each document. The document bottom comparator 96 compares the value in the document bottom latch 98 to the current cell count. If the cell count is greater than the value in the latch 98, and if the current cell is determined to be a bottom, then the current count replaces the previous value in the bottom latch 98. Thus the bottom latch 90 saves the lowest bottom for each document. The highest top and lowest bottom are written to register #8 (blocks 100, 102) when document presence goes active (i.e. trailing edge). The subsystem microcomputer 58 may then read the top and bottom for that document before the next document 20 trailing edge.

The document presence detect logic 74 requires three white scans of video to define a leading edge. In order to keep from losing the first three scans of video, the video is written into a three scan delay memory 108. The scan delay memory 108 consists of six 93422A bipolar RAMs, two 74F373 latches, and two 74F163 address counters. Video from the video input latch is written into a two scan delay memory. Two scans later, the video is read from the two scan delay memories and latched. This video is then delayed an additional scan by the three scan delay memory. The three scan delay video is then latched. The two and three scan delay video taps may be read for diagnostic purposes through register #2, block 108. The three scan delay video is latched again by the video output latch 110 and sent to the video correlator unit 42. Note that when document presence is inactive, the video output latch 110 is cleared (all outputs are low).

Video from the video input latch 110 is replaced by video from register #1, block 112, when the unit 40 is in a diagnostic mode. Register #1, block 112, consists of a diagnostic video input register and a read buffer. Diagnostic video is written to the video input register. The diagnostic controller then has the option of writing the video into the video memory 113 or of sending the video through the unit 40 directly from the register #1, block 112. For full speed testing, the video memory is loaded with the video pattern, and is then placed in an unload mode to send the video to the rest of the unit 40. The diagnostic memory address may be read from diagnostic clock register #6, block 124. The diagnostic memory write and unload functions are controlled by the diagnostic master controller 122.

Communications between the microcomputer 58 and the VFUIN unit 40 occur over multibus 48. The unit 40 has a jumper option which allows the unit 40 to be mapped into either the multibus memory address space or the multibus I/O address space. The "base" address for the unit 40 is determined by a PAL16C1. The base address may have a value ranging from 000000 to FFFE00 (HEX) in memory space or from 0000H to FE00H in I/O space, in increments of 0200H. This value is identical for all VFU units 40, 42, 44 and 46. Each VFU unit also has a switch selectable "port" address which may have a value ranging from 000 to 1E0 (HEX) in increments of 020H. This value is added to the base address to form the start address for the unit. For example, if the PAL is programmed for a base address of 0C000H and the switch is set to 1 (port address=020H) then the VFUIN unit 40 base address will be 0C020H. The individual parameter registers are at even addresses starting at the unit's start address. In the above example, register zero, block 120, will be at 0C020H, register #1, block 112, will be at 0C022H, register #2, block 108, will be at 0C024H, etc. The multibus read and write signals and address decode signal are gated together and sent to a PAL16R4 along with the four least significant address bits. The PAL outputs the following signal functions:

| | |
|---|---|
| /XACK | Acknowledge to multibus master |
| /ENA 0-7 | Enables the low order register decoder |
| /ENA 8-15 | Enables the high order register decoder |
| BR/W | Controls the data bus transceiver direction |
| ADR 1-3 | The three least significant address bits |

The enable and address bits are sent to the register decoders, which determine which of the sixteen possible parameter registers is being accessed. The bus write bit determines whether the operation is a write or read operation.

Register 120 of the VFUIN unit 40 consists of register zero. Register zero contains the following:
 1. 4 bit command field (bits 0.0-0.3)
 2. Port select bit (bit 0.4)
 3. System image fault (bit 0.6)
 4. Image system CLR (bit 0.7)

The 4 bit command field latches VFUIN unit 40 operation commands. The master controller 122 initiates the unit 40 operating mode depending on the command received from this command field.

The master controller also controls the mode of operation of the document presence controller 74 depending on the command. When in a diagnostic mode, the master controller enables clocks to the board logic. The diagnostic video memory 113 is also controlled by the master controller.

Video from the selected transport is clocked by the data clock. When unit 40 is in a diagnostic mode, the clock is replaced with a diagnostic clock under control of the diagnostic controller. The diagnostic clock is capable of operating in the following modes:
 1. Free Running—The diagnostic controller sets the clock enable signal active, enabling the multibus clock.
 2. Single Step—The diagnostic controller causes the clock enable signal to remain active for one clock period.
 3. Clock Counter—The desired number of clocks is written to register #6, block 124, which consists of two 8-bit counters (U18, U31). The counters then count down until they reach zero. Each count causes a single diagnostic clock. When the counter reaches zero, the count enable goes inactive and clocking is discontinued. The diagnostic clock count may be read for test purposes through the register #6 read buffers (U19, U32). Note: The diagnostic controller monitors the clock counter carry to determine when it reaches a count of zero. One additional clock will occur before the controller is able to remove the clock enable. The counter must therefore be loaded with a value of one less than desired clock count.

VIDEO FORMAT UNIT

VIDEO CORRELATOR UNIT

FIGS. 4-7 Overview

The video correlator unit 42 (VFUVC) receives 4-bit grey video data from the video input unit 40 and processes each cell to determine whether it is black or white. The decision is made based on a comparison of the cell's grey level with the average grey level of the cells in a 5-by-5 or 7-by-7 area surrounding the cell. If the center cell is darker than the area sum average, then it is correlated black. If the center cell is lighter than the area sum average, then it is correlated white. The correlated video is then output to the video filter unit 44.

The VFU correlator unit 42 is able to use either a 5-by-5 or 7-by-7 area to correlate the video. Document types which have smaller print, for example, correlate better with the smaller 5-by-5 area sum. The area is selected by the subsystem microcomputer 58 (FIG. 2) for the given application. The subsystem microcomputer 58 is also able to select one of four correlator curves. A darker curve permits center cells which are slightly lighter than the area sum average to correlate black, while a lighter curve requires the center cell to be darker than the area sum average to correlate black.

Referring now to FIG. 4, video is received from the VFUIN unit 40 at a rate of two 4-bit cells per clock cycle and 512 cells per scan. The video is received and latched by the video input latch 140.

The first step in the correlation process is to generate a five or seven scan row sum for each cell. Refer to Table 1. The seven scan row sum for cell 6 of scan 8 is the sum of cell 6 for scans 2, 3, 4, 5, 6, 7, and 8, as shown below:

|  | SCAN | | | | | | |
| --- | --- | --- | --- | --- | --- | --- | --- |
|  | 2 | 3 | 4 | 5 | 6 | 7 | 8 |
| Cell 6: | 4 | 7 | 8 | 9 | 10 | 11 | 10 |
| Row Sum = | 4 + 7 + 8 + 9 + 10 + 11 + 10 = 59 | | | | | | |

In order to generate the row sum, each cell is written into scan delay logic 142 from the video input latch 140. Each cell is read from the scan delay logic 142 seven scans after it is written into the memories. The delayed cell is subtracted from the new cell (from the video input latch 140) to form the cell delta at adder 144. Referring to Table 1, assume the new cell from the video input latch 140 is cell 6 of scan 8. The delayed cell that is read from the scan delay logic 142 is cell 6 of scan 1. Then the cell delta is as follows:

Delta=New Cell−Delayed Cell=10−2=8

The cell delta for each cell is then added in adder 146 to the row sum for that cell from the previous scan. Thus, for the previous example, the row sum for cell 6 of scan 7 is 51. And the cell delta for cell 6 of scan 8 is 8. The new row sum is as follows:

Row Sum (scan 8)=Old Row Sum+Delta=51+8=59.

The new row sum is then sent to the row sum memory 148 where it is delayed one scan. This delayed row sum then becomes the old row sum for scan 9. The row sum algorithm is the same for the 5-by-5 correlator except that the input cell is delayed by five scans instead of seven scans.

The next step in the 7-by-7 correlator algorithm is to generate a 7-by-7 cell area sum by adding seven consecutive row sums. In Table 1, the area sum for the 7-by-7 area surrounding cell 6 of scan 4 (within the square) is the sum of row sums 3 through 9 or scan 7, as shown below:

Area Sum (6)=12+18+30+51+74+54+37=276

The area sum for cell 7 of scan 4 is the sum of row sums 4 through 10 of scan 7:

Area Sum (7)=18+30+51+74+54+37+23=287

The area sum for cell 8 of scan 4 is found by adding row sums 10 and 11, subtracting row sums 3 and 4, and adding the result to the area sum for cell 6. The values formed by adding row sums 10+11 and row sums 3+4 are the partial sums generated by adder 150, and the difference from subtracting the two partial sums is the partial sum delta adder 152. The calculations for area sum (8) are shown below:

Partial Sum Delta (8)=Row Sums (10+11)−(3+4)

Area Sum (6)=Row Sums (3+4+5+6+7+8+9)

Area Sum (8)=Row Sums (5+6+7+8+9+10+11)

The area sum for cell 9 of scan 4 is found by adding row sums 11 and 12, subtracting row sums 4 and 5, and adding the result to the area sum for cell 7, as shown below:

Partial Sum Delta (9)=Row Sums (11+12)−(4+5)

Area Sum (7)=Row Sums (4+5+6+7+8+9+10)

Area Sum (9)=Row Sums (6+7+8+9+10+11+12)

The area sums calculated in adder 154 are latched by the area sum latch 156 and sent to the area sum PROMs 158.

In addition to the five and seven scan delay taps, the scan delay logic 142 outputs video after two and three scans. The two scan delay tap is selected by the center cell selector for the 5-by-5 correlator. The three scan delay tap is selected by the center cell selector for the 7-by-7 correlator. The selected center cells are then delayed six clock cycles by the center cell delay logic 160. This places center cell (N) at the input to the center cell comparators 158 at the same time as area sum (N) is output from the area sum latch 156 to the area sum PROMs 158.

The PROMs 158 output the area sum thresholds, which are compared to the center cells from the center cell logic 160. If the center cell value is greater than the threshold, then the comparator outputs a one (black). If the center cell value is less than or equal to the threshold, then the comparator outputs a zero (white). The correlated video from the center cell comparator 158 is then latched and sent to the filter unit 44 (FIG. 2). In order for the row sum and area sum values to be valid, it is necessary that they are correct at power-up. If the first area sum is incorrect, then all area sums will be incorrect. A clear bit is generated by the document edge controller (not shown) which causes the scan delay logic 142, row sum logic 146, and area sum logic 156 to be cleared to all zeros at power-up and after each trailing edge.

The address counters 162 provide the addresses to the scan delay memories 142, row sum delay memories 148, and center cell delay memories 160. The three least significant address bits and the second address carry are sent to the document edge controller. The document edge controller initializes the address counters at trailing edge.

The subsystem microcomputer 58 controls the operation of unit 42 and performs diagnostic operations on unit 42 through the nine parameter registers 164, 166, 168, 170, 172, 174, 176, 178, and 120. The multibus interface logic 118 decodes the multibus port address to provide read and write signals to the parameter registers and also controls the data bus transceiver enable and direction. Commands to unit 42 are written to and read from parameter register #0, block 120. The controller 138 of unit 42 receives the commands from parameter register #0, block 120. Controller 138 selects the correlator curve, enables either the 5-by-5 or 7-by-7 correlator, and provides diagnostic clocks and control signals to the rest of the unit 42. Parameter register #1, block 164 is the video input port. Diagnostic video may be written to the register #1, block 164, and then clocked through the unit 42 from the controller 138. In addition, the on-line or diagnostic video may be read from the register #1, block 164, to test the video busses. The two and three scan delay taps may be read from parameter register #2 block 166. The five and seven scan delay taps and the center cell may be read from parameter register #3, block 168. Parameter register #4, block 170, is the row sum output port, and parameter registers #5 and #6 (blocks 172, 174) are the partial sum delay outputs. Parameter register #7, block 172, and the first four bits of parameter register #8, block 178, are the area sum outputs. The address counter and the unit clear bit may also be read from parameter register #8, block 178.

Figure 5:
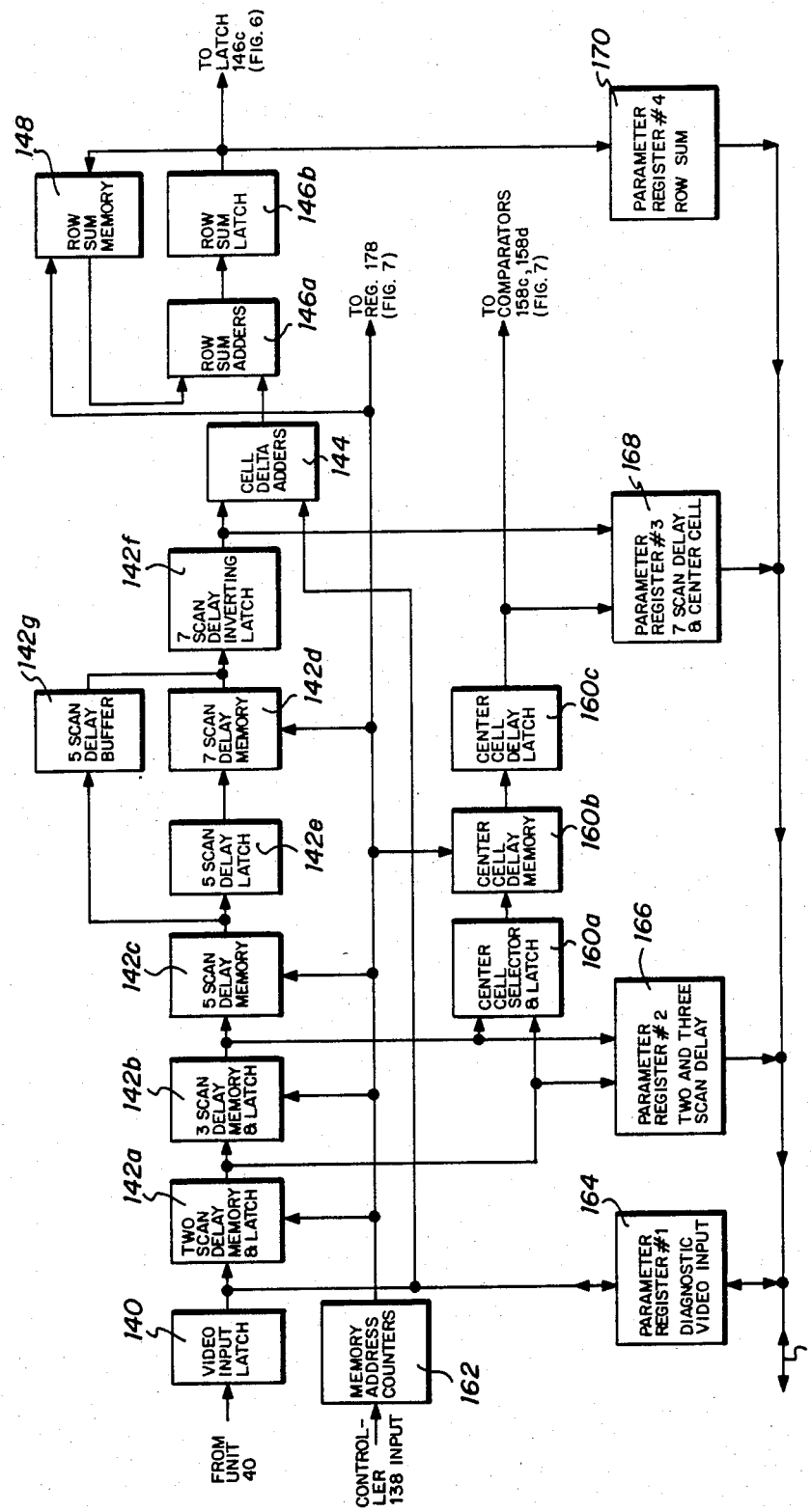
FIGS. 5-7 are detailed block diagrams of the video correlator unit shown in FIG. 4.
Figure 6:
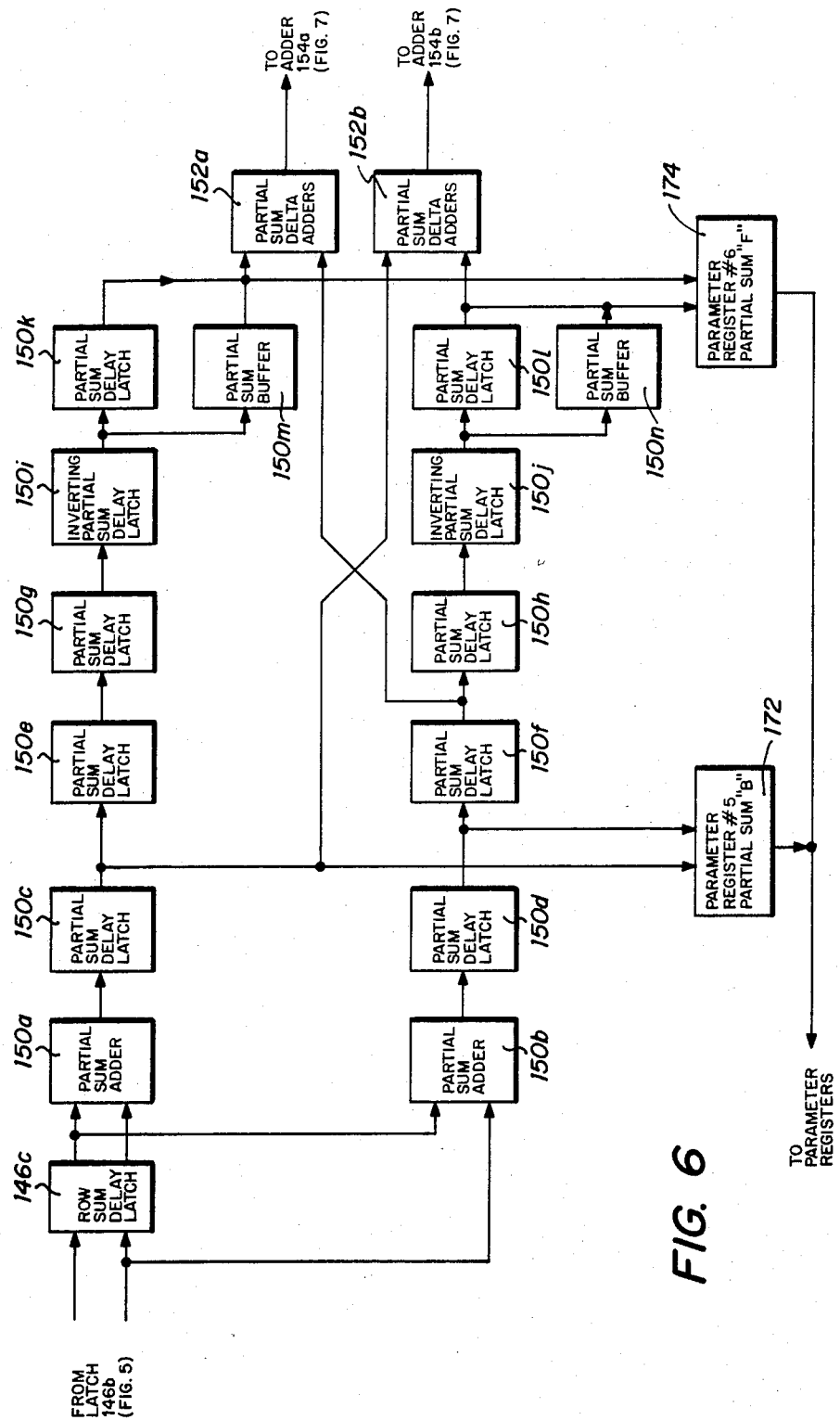
Figure 7:
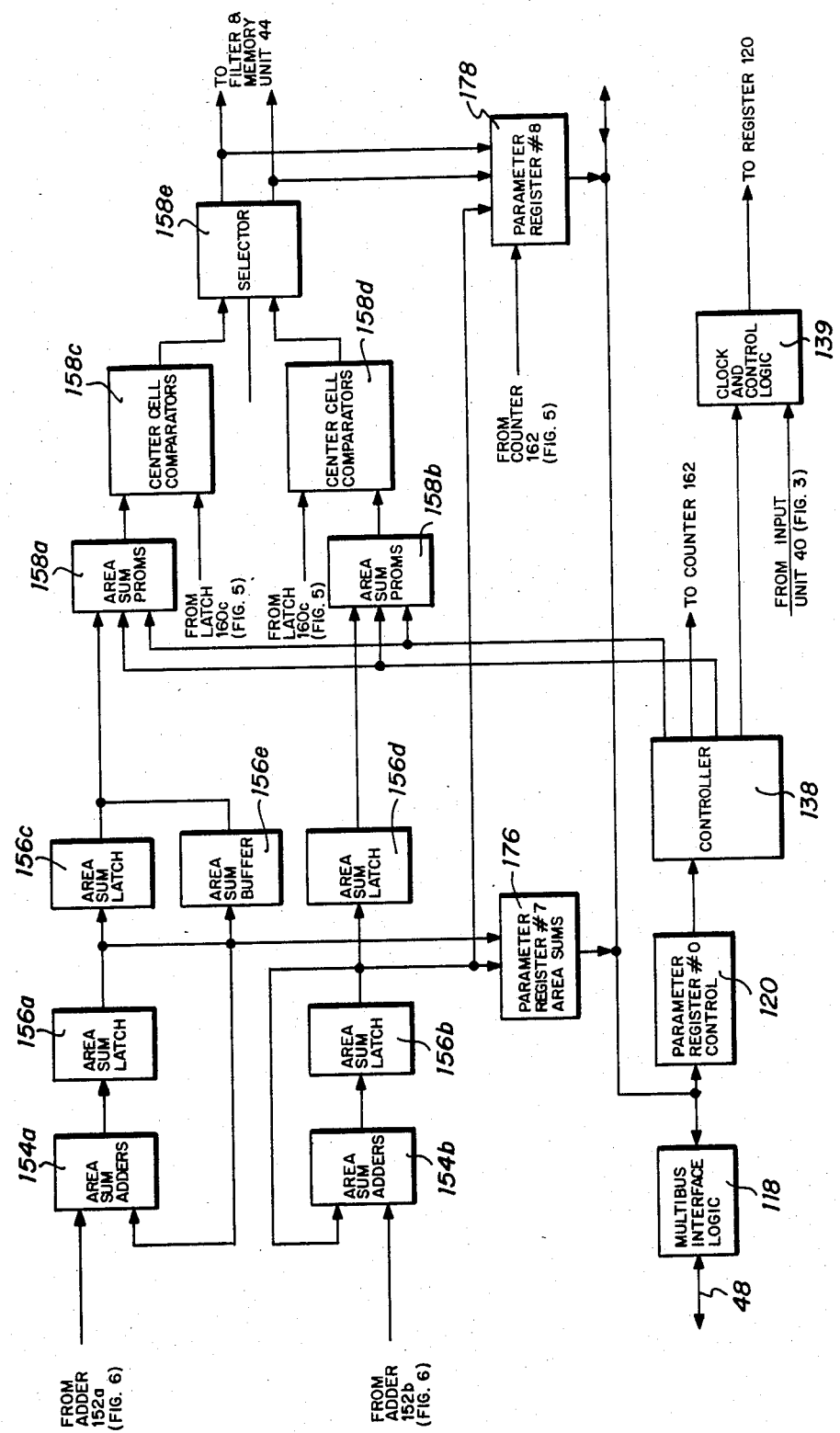

Detailed Description
FIGS. 5-7

Referring now to FIG. 5, the VFUVC unit 42 receives two 4-bit cells of video per clock cycle from the video input unit 40. Each 512 cell scan of video requires 256 clock cycles. The video data is received and latched from unit 40 by a 74ALS575 octal D flip-flop. When unit 42 is in the on-line mode, the video is output to the scan delay logic 142, the cell delta adders 144, and parameter register #1, block 164. The video input latch 140 is disabled (high impedance) when unit 42 is in the diagnostic mode. The clear inputs signal from the document edge controller forces the latch 140 to output zeros from trailing edge to leading edge. All memories and registers are cleared after trailing edge.

The two scan delay memory 142a consists of four 93422A RAM memories organized as a 512-by-8 memory. Video from the video input latch 140 is written to the memory 142a and output from the memory 142a two scans later. The output from the memory 142a is latched by a 74F373 transparent latch and sent to the three scan delay memory 142b.

The three scan delay memory 142b is organized as a 256-by-8 memory, which delays the video one additional scan. The three scan delay video is latched by a 74F373 and sent to the five scan delay logic 142c. The two and three scan delay video is also sent to the center cell selector 160a and parameter register #2, block 166.

The five (142c) and seven (142d) scan delay memories and latches (142e, 142f) each delay the video an additional two scans. The seven scan delay latch 142f is an inverting latch (74F533). When unit 42 is performing a 7-by-7 correlation, video from the seven scan delay memory 142d is sent to the inverting latch 142f. When unit 42 is performing a 5-by-5 correlation, the seven scan delay memories 142d are placed in a high impedance state and the five scan delay video (output of memory 142c) is sent to the inverting latch 142f through a 74LS244 buffer 142g.

The old cells (inverted) from the scan delay logic 142 and the new cells from the video input latch 140 are sent to the cell delta adders 144. By adding the input video plus the inverted delayed video, with the input carry pulled high, the result is the 2's complement difference between the new video and the delayed video. The carry out from the adder is inverted to preserve the sign of the result. The result is sent to the row sum adders 146a.

The row sum adders 146a add the row sum from the previous scan to the new cell delta to generate the new row sum. The new row sum is then latched by a 74F373 latch 146b and sent to the row sum delay memory 148 and the row sum delay latches 146c (FIG. 6). The row sum delay memory 148 delays the row sum one scan and outputs it one scan later (old row sum). When a trailing edge occurs, this disables the row sum memory 148 outputs, and the old row sums are pulled down to zero. Because latch 140 causes the scan delay memories 142 to be cleared at the same time, the row sum logic 146 will be cleared eight scans after trailing edge.

The center cell selectors 160a receive video from the two and three scan delay latches (142a, 142b). When the 7-by-7 correlator is enabled, the center cell is selected from the three scan delay tap. When the 5-by-5 correlator is enabled, the center cell (160b) is selected from the two scan delay tap. The selected result is latched by a 74S374 octal register 160c from the logics that the even and odd two scan delay cells are reversed with respect to the even and odd three scan delay cells at the selectors. This causes the odd and even center cell output to be reversed between the 5-by-5 and 7-by-7 correlators. The center cells are sent to the center cell comparators 158c, 158d (FIG. 7).

The memory address counters 162 consist of three 74F163 binary counters. Controller 138 (FIG. 4) provides the address counter enable. The clock is synchronized to the video input by the trailing edge signal from the document edge controller. The address is sent to the scan delay memories 142a, 142b, 142c, 142d, the row sum delay memories 148, and the center cell delay memories 160b. This address is also sent to the document edge controller which uses the address for begin scan timing.

Parameter register #1, block 164, is the diagnostic video input register. Diagnostic video is written to a 74LS374 register and read from a 74LS244 buffer. When unit 42 is in the diagnostic mode, video that is written to parameter register #1, block 164, may be clocked through unit 42 to test the logic. Video data may be read from the video input latch (on-line mode) or the parameter register (diagnostic mode) via the 74LS244 buffer.

Parameter registers #2, #3, and #4 (blocks 166, 168, 170) are read only registers. The two and three scan delay video is read from parameter register #2, block 166, which consists of two 74LS244 buffers. If the 5-by-5 correlator is selected, then the five scan delay video is read from the low byte of parameter register #3, block 168. If the 7-by-7 correlator is selected, then the seven scan delay video is read from the low byte of parameter register #3, block 168. The five and seven scan delay video is inverse video. It is inverted back to true video by a 74LS240 buffer. The center cell is read from the high byte of parameter register #3, block 168, through a 74LS244 buffer. Parameter register #4, block 170, is the row sum register, and consists of two 74LS244 buffers.

Referring now to FIG. 6, the row sums from the row sum latches 146b are delayed one clock cycle by the row sum delay latches 146c. If the row sums into the row sum delay latches 146c are for cells 4 and 5, then the row sums out of the latches are for cells 2 and 3. The partial sum adders (150a, 150b) each form the sums of two consecutive row sums: adder 150a adds the row sums for cells 2 and 3 and adder 150b adds the row sums for cells 3 and 4. These partial sums are latched by the first set of partial sum latches 150c and 150d. The partial sums are then delayed an additional three clock cycles for the 5-by-5 correlator or four clock cycles for the 7-by-7 correlator, and inverted, by partial sum latches 150e-n. The partial sum buffers (150m, 150n) bypass the last set of latches 150k, 150L for the 5-by-5 correlator.

The inputs to the partial sum delta adder 152a for 7-by-7 correlator are from latch 150f and latch 150k and to adder 152b from latches 150c and 150L. If the partial sums from latches 150k and 150L are for row sums 0+1 and 1+2, respectively, then the partial sums deltas are:

1. Row Sums (7+8) minus Row Sums (0+1)

2. Row Sums (8+9) minus Row Sums (1+2)

The first partial sum delta is for center cell 5 (output of adder 152a) and the second partial sum delta is for center cell 6 (output of adder 152b). The partial sum deltas for the 5-by-5 correlator for row sums 0+1 and 1+2 are:

1. Row Sums (6+7) minus Row Sums (1+2)
2. Row Sums (5+6) minus Row Sums (0+1) and the results are for center cells 4 and 5, respectively. The partial sums from the first set of partial sum latches (150c, 150d) may be read from parameter register #5, block 172, and the last set of partial sums (150k, 150L) may be read from parameter register #6, block 174.

Referring to FIG. 7, the area sum adders 154a and 154b add the partial sum delta to the previous area sum to get the new area sum. This area sum is then latched by the area sum latches (156a, 156b). The new area sum for cell 5 (output of adder 154a, 154b) is the area sum for cell 3 (output of latch 156a, 156b) plus the partial sum delta (row sums (7+8) minus row sums (0+1)) output of adders 152a, 152b. The new row sum is latched and sent back to the area sum adders 154a and 154b and to the area sum delay logic 156c-e.

The area sum delay logic consists of two 74ALS574 latches 156c, 156d and a 74LS244 buffer 156e. When the 5-by-5 correlator is selected, both area sums are delayed by one clock cycle. When the 7-by-7 correlator is selected, only one of the area sum channels is delayed. This is done by enabling the area sum buffer 156e instead of the area sum delay latch 156c when the 7-by-7 correlator is selected. The delayed area sums are sent to the area sum PROM 158a and 158b.

The area sums from the area sum delay logic 156c and 156d are sent to the area sum PROMs 158a and 158b. Note that two least significant bits of each area sum are disregarded. In addition, the PROMs, 158a and 158b receive two curve bits and the area select bit from controller 138. The PROMs 158a and 158b determine the minimum value that the center cell may have in order to become a black cell. The curve select bits select one of four correlator curves. The curve is set up by the controller 138 for the given application. The area select bit tells the PROMs 158a and 158b whether the area sum is for 49 cells (7-by-7) or 25 cells (5-by-5). The center cell comparators 158c and 158d compare the center cells to the minimum threshold from the PROMs 158a and 158b. If the center cell is greater than the threshold, then the resulting cell is black. If the center cell is less than or equal to the threshold, then the resulting cell is white. The correlated cells for the 5-by-5 correlator are returned to the correct order by the selector 158e. The outputs from the correlator selector 158e are latched and the resulting correlated video is sent to the VFU filter unit 44 (FIG. 2).

The area sums from the area sum latches are read from parameter register #7, block 176, and the first four bits of parameter register #8, block 178. The correlated video is read from bits 4 and 5 of parameter register #8, block 178, the clear bit is read from bit 6, and the address is read from bits 7 through 15.

Communications between the subsystem microcomputer 58 (FIG. 2) and the VFUVC unit 42 occur over multibus 48. Unit 42 has a jumper option which allows unit 42 to be mapped into either the multibus memory address space or the multibus I/O address space. The base address for unit 42 is determined by a PAL16C1. The base address may have a value ranging from 000000 to FFFE00 (HEX) in memory space or from 0000H to FE00H in I/O space, in increments of 0200H. This value is identical for all VFU units 40, 42, 44, and 46. Each VFU unit also has a switch selectable 'port' address which may have a value ranging from 000 to 1E0 (HEX) in increments of 020H. This value is added to the base address to form the start address for the unit. For example, if the PAL is programmed for a base address of 0C000H and the switch is set to 2 (port address=040H) then the VFUVC base address will be 0C040H. The individual parameter registers are at even addresses starting at the unit start address. In the above example, parameter register #0 will be at 0C040H, parameter register #1 will be at 0C042H, parameter register #2 will be at 0C044H, etc. The multibus read and write signals and address decode signal are gated together and sent to a PAL16R4 along with the four least significant address bits. The PAL outputs the following signals:

| /XACK | Acknowledge to multibus master |
|---|---|
| /ENA 0-7 | Enables the low order register decoder |
| /ENA 8-15 | Enables the high order register decoder |
| BR/W | Controls the data bus transceiver direction |
| ADDR 1-3 | The three least significant address bits |

The enable and address bits are sent to the register decoders, which determine which of the sixteen possible parameter registers is being accessed. The bus write bit determines whether the operation is a write or read operation.

Parameter register #0, block 120, is the VFUVC command register. Commands to the register are decoded and executed by the controller 138. The commands include:

00-Enter on-line mode
01-Select curve 0
11-Select curve 1
21-Select curve 2
31-Select curve 3
02-Select 7-by-7 correlator
12-Select 5-by-5 correlator
03-Disable address counter
13-Enable address counter
04-Write diagnostic video (normal)
14-Write diagnostic video and cycle
05-Write diagnostic video, disable address counter
15-Write diagnostic video, disable address counter, cycle
06-Write diagnostic video, wait for /RD04 to continue Upon power-up, subsystem microcomputer 58 sends a single diagnostic clock to reset the document edge controller, then enters the on-line mode. Controller 138 defaults to curve 0 and 7-by-7 correlator. Upon completion of the power-up sequence, controller 138 enters state 0, where it waits for a command to parameter register #0. When a command is written to parameter register #0, controller 138 enters state 1 and waits for the register write cycle to complete. Controller 138 then decodes the command. If the command is 0 (enter on-line mode) then controller 138 goes to state F and repeats the power-up sequence. If the command is a curve select command, then controller 138 sets the proper curve bits (curve 0.0-0.1) and returns to state 0. If the command is 02 or 12, then controller 138 sets or resets the 7-by-7 correlator select bit as required and returns to state 0. If the command is 03 or 13, then controller 138 sets or resets the address enable as required and returns to state 0. When the address counter is disabled, video that is written to one of the memories is read out one clock later instead of one or two scans later.

The counters of unit 42 are always enabled when the unit 42 is on-line. When one of the write video commands is decoded, controller 138 enters state 2, enters the diagnostic mode, sets the diagnostic begin scan, and resets the diagnostic clock and item present signals. In state 2, controller 138 sets the diagnostic clock, which causes the document edge controller to enter the trailing edge state. In state 3, controller 138 resets the clock and begin scan and returns to state 2. Controller 138 cycles between states 2 and 3 until the clear bit from the document edge controller goes high, and then cycles between states 4 and 5 until the clear bit goes low again. Each cycle causes one clock cycle to the hardware.

As the VFUVC unit 42 controller 138 cycles between states 2 and 3 and states 4 and 5, the document edge controller is clearing the scan delay, row sum, and area sum logic. When the clear bit goes low in state 4, controller 138 advances to state 6. At this point the hardware is initialized. Controller 138 continues to send diagnostic clocks in states 6 and 7, until the address counter carry goes high. Controller 138 then sets the diagnostic item present signal and advances to state 8. In state 8 the clock is set, which causes the document edge controller to enter its leading edge state. If the command is 05 or 15, controller 138 also disables the address counters. Controller 138 then advances to state 9. In state 9, controller 138 waits for a write to parameter register #1 if the command is 4 or 5, or a read from parameter register #4 if the command is 6. If the command is 7, controller 138 halts. Controller 138 goes to state 10 when the parameter register #1 write or parameter register #4 read goes low, and then to state 11 when the signal goes high again.

In states 11 and 12, controller 138 sends one diagnostic clock cycle, which causes the video in parameter register #1, block 164, to be clocked through the hardware. Command 6 allows the subsystem microcomputer 58 to write video to parameter register #1, block 164, and then read the row sum results before a diagnostic clock is sent. If bit 4 of the command register is set when controller 138 is in state 12, it continuously cycles between states 11 and 12. This feature may be used as a scope loop test to test the video buses. If bit 4 of the command register is not set, then controller 138 returns to state 9 and waits for another register #1 write or register #4 read to send the next clock cycle.

In order to clear unit 42 at the start of a diagnostic video input command, the diagnostic video register (parameter register #1) must be cleared before the video command is sent to the command register. If this is not done, the scan delay memories will be filled with the value that is in the register before the video command is input.

The VFUVC unit 42 receives the following control signals from the video input unit 40:
- Data clock. The maximum frequency for this clock is approximately 11 MHZ.
- Data valid. A scan of video from the data lift unit consists of 512 cells of video plus 32 cells of invalid reference video. The data valid signal is low from cells 0 to 511.
- Begin scan. This signal is low two clock periods before cells 0 and 1 are sent to the card and remains low for one clock period.
- Item present. This signal goes low when there is a document in front of the data lift unit optics. It goes low at the same time as the begin scan.

The data clock and data valid signal are gated to form a controlled clock. This clock is shut off during the invalid cell periods. The controlled clock is used to generate the video write enables to the memories to ensure that valid data is not overwritten during invalid clock cycles. Note that the rising and falling edge of the data valid signal must occur after the falling edge of the data clock to prevent spikes on the controlled clock. The clock, item present, and begin scan signals are sent to a 74S157 selector. If the card is on-line, then the signals from VFUIN unit 40 are output from the selector. If unit 42 is in the diagnostic mode, then the diagnostic control signals from the VFUVC controller 180 are selected.

The document edge controller causes the card to be cleared at trailing edge, sends trailing edge to the address counters, and sends item present and begin scan signals to the filter unit 44. The trailing edge signal initializes the address counters. The begin scan signal to the VFUFM unit 44 is sent two clock cycles before the first two cells are sent. The item present signal is set at the beginning of the second scan for a 5-by-5 correlator, or at the beginning of the third scan for a 7-by-7 correlator. This is to account for the two or three scans of delay from the time VFUVC unit 42 receives the first scan of video until the first scan of video is output from the center cell delay logic. The item present signal remains active to VFUFM unit 44 for two or three scans after trailing edge. The three address counter LSB's and the address carry are used to delay the VFUFM control signals with respect to the VFUIN control signal inputs to account for the cell delays within the VFUVC card.

VIDEO FORMAT UNIT

FILTER AND MEMORY UNIT

Figure 8:
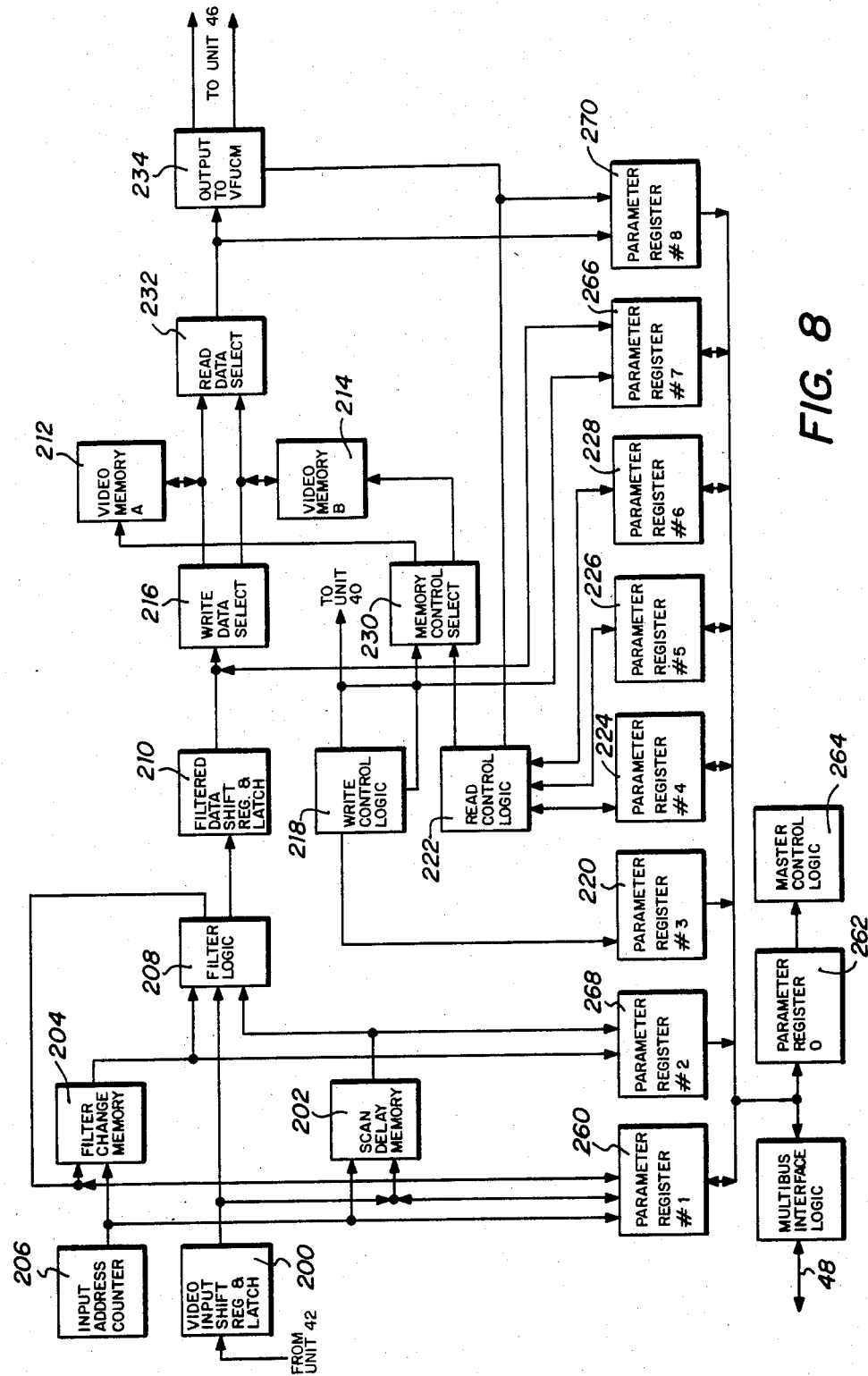
FIG. 8 is a functional block diagram of the video filter unit shown in FIG. 2.
Figure 9:
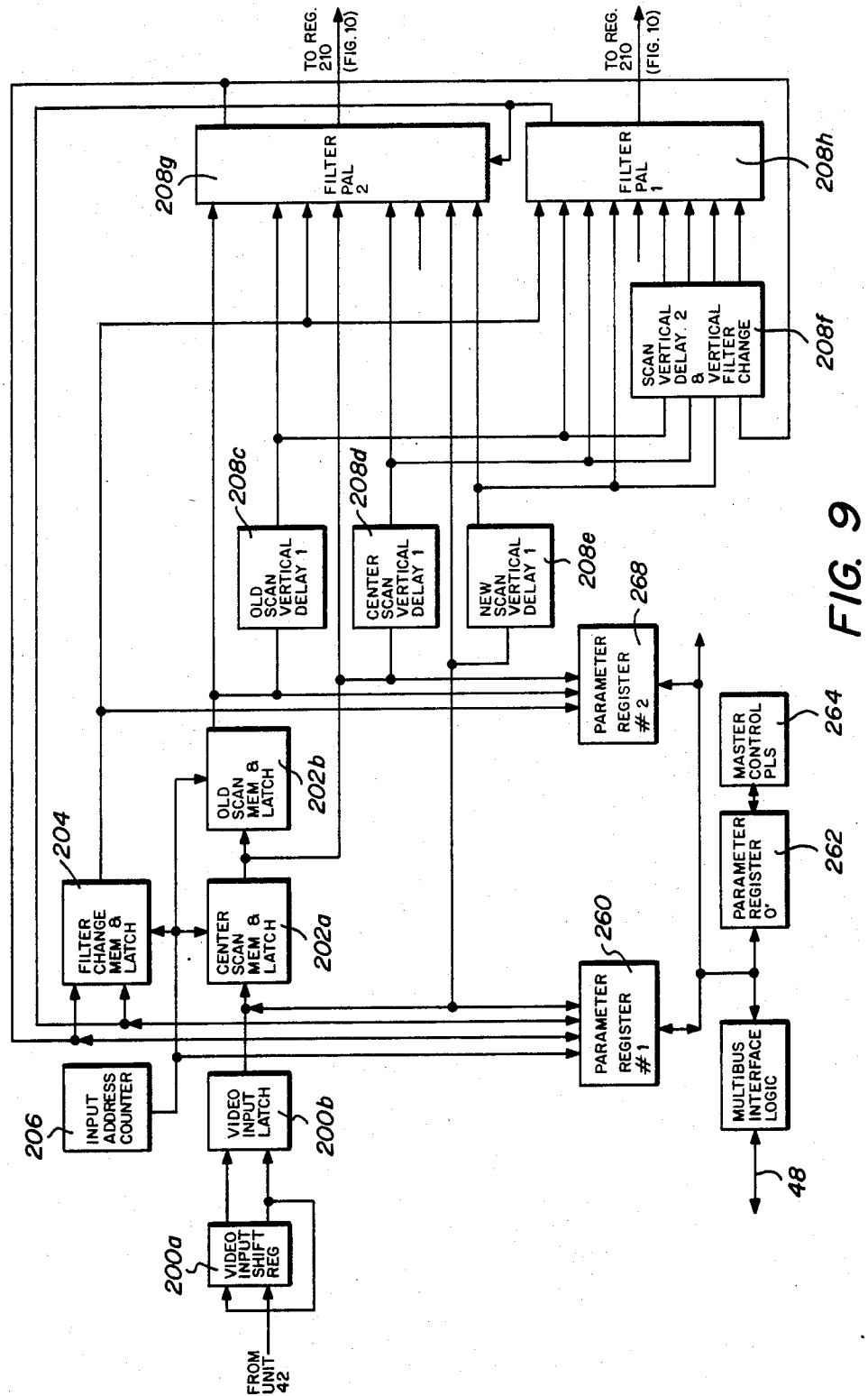
FIGS. 9 and 10 are detailed block diagrams of the video filter unit shown in FIG. 8.
Figure 10:
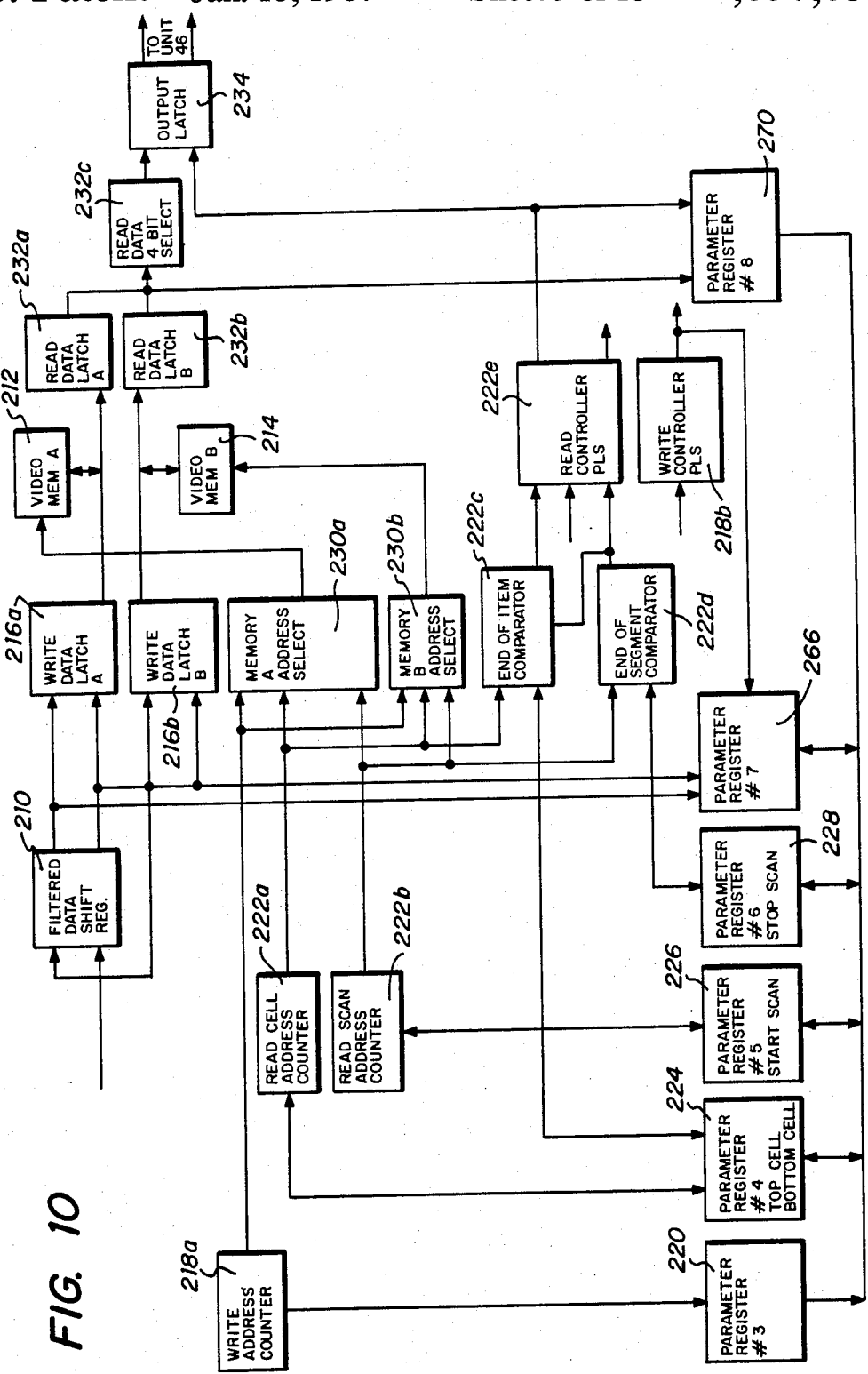

FIGS. 8-10 Overview

The filter and memory unit 44 (FIG. 2) receives black and white video from the video correlator unit 42. If the filter unit 44 has been enabled by the subsystem microcomputer 58, (FIG. 2), the video will be filtered. If the filter unit 44 is disabled by subsystem microcomputer 58, the video will be passed through the filter unchanged. After passing thru the filter logic, the video is stored in one of two video memories. By having two video memories, the unit 44 can allow an image to be unloaded to the video compressor unit 46 in the format it requires while another image is being loaded from the video correlator unit 42. The memory to be loaded is selectable by subsystem microcomputer 58.

Referring to FIGS. 8 and 9, the video coming to the VFUFM unit 44 is organized into scans which consist of 512 cells. The video comes to the VFUFM unit 44 two cells at a time. The video is widened to four cells in the video input shift register 200a and latch 200b. The purpose in widening the video is to allow the filter logic more time to perform its function (184 nanoseconds for four cells as opposed to 92 nanoseconds for two cells). The video is then loaded into a scan delay memory 202 and a filter logic 208. Addressing for the scan delay memory 202 and the filter change memory 204 is provided by the input address counter 206. Address counter 206 is reset at the beginning of each scan.

The filter logic 208 filters four cells at a time. It builds an array consisting of new scan video (video currently being loaded in from the VFUVC 42), center scan video 208a (video that has been delayed one scan), old scan video 208b (video that has been delayed two scans), horizontal filter change data 208c, d, e (unloaded from the filter change memory 204), and vertical change data 208f. This array is used as inputs for two filter PALs 208g and 208h. The filter PALs 208g and 208h will output data which is filtered video corresponding to the four cells of the center scan which was output from the scan delay memories on the previous clock. If the filter is disabled, no bits are allowed to change. If the filter is enabled and a cell was changed, the corresponding change bit is set active. The filter change bits are loaded into the filter change memory 204. On the next scan these horizontal change bits are used in the array. The highest order change bit coming from the filter PALs 208g and 208h is delayed through a latch 210 to form the vertical change bit. Each PAL 208g and 208h handles filtering two cells of the four being passed on each clock.

Each filter PAL 208g and 208h uses 16 "C" patterns (8 for each cell being filtered) which determine if a cell is to be filtered or not. When a cell is filtered, it is inverted. For example, a cell which is a zero (white), is inverted to a one (black). The filter PAL array shown below will be used to explain the "C" pattern filter algorithm.

| FILTER PAL ARRAY | |
|---|---|
| ! — — ! | |
| ! /VC ! | VC — vertical filter change |
| N0 ! C0 ! O0 ! | |
| N1 ! C1 ! O1 ! /HC1 | N — new scan video |
| N2 ! C2 ! O2 ! /HC2 | C — center scan video |
| N3 ! C3 ! O3 ! | O — old scan video |
| | HC — horizontal filter change |

| FILTERED CELL 1 PATTERNS (C1 IS BEING FILTERED) | | | | |
|---|---|---|---|---|
| Cell Pattern | Array Value | Inhibit | "C" Orientation | Output |
| 11 | N0=1 C0=1 | /VC=0 | *** | 1 |
| 10 | N1=1 C1=0 | | * | |
| 11 | N2=1 C2=1 | | *** | |
| 11 | C0=1 O0=1 | /VC=0 | *** | 1 |
| 01 | C1=0 O1=1 | | * | |
| 11 | C2=1 O2=1 | | *** | |
| 00 | N0=0 C0=0 | /VC=0 | *** | 0 |
| 01 | N1=0 C1=1 | | * | |
| 00 | N2=0 C2=0 | | *** | |
| 00 | C0=0 O0=0 | /VC=0 | *** | 0 |
| 10 | C1=1 O1=0 | | * | |
| 00 | C2=0 O2=0 | | *** | |
| 111 | N0=1 C0=1 O0=1 | /HC1=0 | *** | 1 |
| 101 | N1=1 C1=0 O1=1 | | * * | |
| | | | * * | |
| 101 | N1=1 C1=0 O1=1 | /HC1=0 | * * | 1 |
| 111 | N2=1 C2=1 O2=1 | | * * | |
| 000 | N0=0 C0=0 O0=0 | /HC1=0 | *** | 0 |
| 010 | N1=0 C1=1 O1=0 | | * * | |
| | | | * * | |
| 010 | N1=0 C1=1 O1=0 | /HC1=1 | * * | 0 |
| 000 | N2=0 C2=0 O2=0 | | * * | |
| | | | *** | |

If 1 or more of the patterns are matched, CHG1 will be active.

| FILTERED CELL 1 PATTERNS (C2 IS BEING FILTERED) | | | | |
|---|---|---|---|---|
| Cell Pattern | Array Value | Inhibit | "C" Orientation | Output |
| 11 | N1=1 C1=1 | /VC=1* | *** | 1 |
| 10 | N2=1 C2=0 | CHG1=1 | * | |
| 11 | N3=1 C3=1 | | *** | |
| 11 | C1=1 O1=1 | /VC=1* | *** | 1 |
| 01 | C2=0 O2=1 | CHG1=1 | * | |
| 11 | C3=1 O3=1 | | *** | |
| 00 | N1=0 C1=0 | /VC=0* | *** | 0 |
| 01 | N2=0 C2=1 | CHG1=1 | * | |
| 00 | N3=0 C3=0 | | *** | |
| 00 | C1=0 O1=0 | /VC=0* | *** | 0 |
| 10 | C2=1 O2=0 | CHG=1 | * | |
| 00 | C3=0 O3=0 | | *** | |
| 111 | N1=1 C1=1 O1=1 | /HC2=0 | *** | 1 |
| 101 | N2=1 C2=0 O2=1 | | * * | |
| | | | * * | |
| 101 | N2=1 C2=0 O2=1 | /HC2=0 | * * | 1 |
| 111 | N3=1 C3=1 O3=1 | | * * | |
| | | | *** | |
| 000 | N1=0 C1=0 O1=0 | /HC2=0 | *** | 0 |
| 010 | N2=0 C2=1 O2=0 | | * * | |
| | | | * * | |
| 010 | N2=0 C2=1 O2=0 | /HC2=1 | * * | 0 |
| 000 | N3=0 C3=0 O3=0 | | * * | |
| | | | *** | |

If 1 or more of the patterns are matched, CHG2 will be active.

The change inhibits provided by the filter change bits are to prevent improper filtering under certain conditions. The condition is caused by interlocking "C" patterns of opposite polarity. The practical condition would occur in jagged vertical or horizontal lines with two or more cell thickness. The "C" combinations involved are shown below. 1=Black 0=White.

| 111 | 000 | 111 | 000 | Conditions requiring |
| 1010 | 0101 | 0101 | 1010 | horizontal change |
| 000 | 111 | 000 | 111 | inhibit |

Shown below is an example showing the need for a horizontal change inhibit.

| CELL | |
|---|---|
| 5 | 1111111111111111 |
| 6 | 1010101010101010 |
| 7 | 0000000000000000 |
| 8 | 0000000000000000 |

If the horizontal inhibit were not used, the 1's of cell 6 would become 0's and the 0's would become 1's. The rough boundary would not be smoothed.

| 11 | 00 | 11 | 00 | Conditions requiring |
| 100 | 011 | 001 | 110 | vertical change |
| 110 | 001 | 011 | 100 | inhibit |
| 00 | 11 | 00 | 11 | |

Shown below is an example of a "rough" vertical boundary.

SCAN
54321

11100    In the example to the left, the 1's of scan

|  | -continued |
|---|---|
| SCAN | |
| 54321 | |
| 11000 | 3 would become 0's and the 0's would become |
| 11100 | 1's without vertical change inhibit. The |
| 11000 | rough part the boundary would in effect only |
| 11100 | be shifted. |
| 11000 | |

The following "C" patterns will let two adjacent cells change.

| Vertical | | | Horizontal | | | |
|---|---|---|---|---|---|---|
| 111 | 111 000 | 000 | 11 11 | 11 00 | 00 11 | 00 00 |
| 101 | 101 010 | 010 | 10 01 | 10 10 | 01 01 | 01 10 |
| 101 | 010 101 | 010 | 11 11 | 11 00 | 00 11 | 00 00 |
| 111 | 000 111 | 000 | | | | |

Referring now to FIGS. 8 and 10, after the video has been filtered, it is widened from four bits to eight bits in the filtered data shift register and latch 210. This widening is done because the video memory is organized in bytes. The eight bit wide video then goes into a video memory 212 or 214. The memory 212 or 214 used is determined by the write data select logic 216 and memory control select 230. Each video memory 212 or 214 is 64K bytes deep. The write process is controlled by the write control logic 218. When the document load process is complete, the write control logic 218 will activate the completion interrupt for two clocks. This interrupt is passed to the VFU input unit 40 where it is accessible in the unit status register. The last scan address loaded may be read from parameter register #3, block 220.

The read process of the VFUFM unit 44 runs on a different clock than the write process and is therefore an independent operation. The read process is controlled by the read control logic 222. The process is started by the top and bottom cell (parameter register #4, block 224) and the start scan (parameter register #5, block 226) and the stop scan (parameter register #6, block 228) being loaded by subsystem microcomputer 58. The video memory 212 or 214 is not unloaded in the simple sequential fashion as it was loaded. The "scan address" forms the upper ten bits of the video memory address. The cell address forms the lower six bits of video memory address. The cell address is initially set to the top cell address. The scan address is initially set to the start scan address. The read control logic 222 through memory control select 230 selects which memory 212 or 214 is to be read. The read control logic 222 initially sets a control bit to select the lower 4 bits of the 8 bits read from the video memory 212 or 214. The select is done by the read data select 232 to the output 234 to VFUCM unit 46.

The control logic of unit 44 waits until the VFUCM unit 46 is idle. At that time the lower four cells of the first address are unloaded. The VFUFM unit 44 sends out signals indicating a beginning of document unload and beginning of segment. The scan address is incremented, the lower four cells of the next address are unloaded. This process continues until after the scan address matching the stop scan address has been unloaded. After the last scan address has been unloaded, the end of segment signal is sent to VFUCM unit 46. The read then halts until the VFUCM 46 is ready for more data. At that time, the scan address is set to the start scan address. The upper four cells of the first address are unloaded and the start of segment signal is sent to the VFUCM unit 46. The scan address is incremented and the next location's upper four cells are unloaded.

The unload process continues until the stop scan address has been unloaded. The end of segment signal is sent to the VFUCM 46. The cell address is incremented, and the start scan address is reloaded. When the VFUCM 46 is not busy, the next segment is unloaded. The process continues until the upper four cells of the bottom cell address, and stop scan address have been unloaded. The end of document and end of segment signals are then sent to the VFUCM unit 46. The document unload process is then complete.

Detailed Description

FIGS. 8-10

Referring to FIGS. 8-10, video comes to the VFUFM unit 44 two bits (cells) at a time. The "even" and "odd" video cells arrive every 92 nanoseconds. To allow the downstream logic more time to do its function, the two bit video is "widened" to four bit wide video in the video input shift register 200a. The output of the shift register 200a is clocked into the video input latch 200b every 184 nanoseconds. The video is inverted by the video input latch 200b to make it true (noninverted) data. The data from the video input latch 200b is sent to the center scan memory 208a, the new scan vertical delay 1 latch 208e, and filter PAL 2, 208g. The video may be read by subsystem microcomputer 58 via parameter register #1, block 260, when the clock is in a single step mode.

The input address counter 206 provides addressing for the center scan delay memory 202a, old scan delay memory 202b, and filter change memories 204. Counter 206 is cleared at the time cells 0-3 reach the center scan memory for each scan. Counter 206 is incremented for each four cells.

The filter change memory 204 stores data which indicates which cells of the previous scan were changed by the filter logic 208. This is needed to prevent two horizontally consecutive cells from being changed under certain conditions. The change data is shifted 4 cells off from the scan delay memory 202. For example, the change data for cells 0-3 is stored in location 1 rather than location 0. The filter change memory 204 is implemented by a 93422A 256×4 memory chip with a 35 nanosecond access time. To provide stable data as quickly as possible, the memory output is latched by a 74AS573 transparent latch. Data is stable for the filter PALs 208g and 208h after 54 nanoseconds. The latch enable is provided by a 184 nanosecond period clock. This allows the latched data to be stable for 130 nanoseconds. The filter PALs 208g and 208h have 75 nanoseconds total delay before the new filter change data is ready to be written into the filter memory. At that time, a write pulse is generated for the memory with a duration of approximately 44 nanoseconds. The data is held stable after the write pulse for approximately 18 nanoseconds.

The center scan memory 202a and old scan memory 202b provide the scan delays needed by the filter algorithm. The video is loaded into the center scan memory by the video input latch 200b. Cells 0-3 are stored in location 0, cells 4-7 are stored in location 1 and so on. The center scan data is output to a 74AS573 latch and has identical output timing as the filter change memory 204. The latched center scan video is output to the old scan memory 202b, to filter PAL 208g, and to the center scan vertical delay 1 latch 208d. The old scan memory has the same type latch, timing, and data storage organization as the center scan memory. The latched old scan data is sent to filter PAL 2, 208g, and to the old scan delay 1 latch 208c.

The old latch 208c, center latch 208d, and new scan vertical delay 1 latch 208e are used to provide a single clock delay for the video coming out of the video input latch 200b and the scan delay memories 202. The delay is needed because the filter input requires more than four cells from each scan to implement the filter algorithm. The output of the latches are sent to the filter PALs 208g and 208h and the upper bit of each scan is sent to scan vertical delay 2, 208f. The vertical delay latches 208f are actually implemented in two 74ALS575's. These latches have a clear, which allows zeroing of the downstream video logic, if needed.

The vertical delay 2, 208f, allows for a second clock delay of the scan video. This generates the remaining bits of video needed for the input array used by the filter algorithm. The output of the vertical delay 2, 208f, is sent to filter PAL 1 208h. The vertical filter change bit is generated in latch 208f by delaying the most significant filter change bit by one clock. This bit is used by the filter algorithm to prevent two vertically consecutive bits from being changed under certain conditions.

Filter PALs 208g and 208h implement the filter algorithm. The tables shown below indicate the match up of the external signal names to the equations used in programing the PALs.

The following equations are programned in the filter PALs.

The format is compatable with PAL ASM source standards.

1. If (GND)/FE=N0
2. IF(GND)VC0=N0
3. IF(VCC)CH1A=C2*N2*N1*N0*C0/C1+
   C0*O0*O1*O2*C2*/C1+/C2*/N2*/N1*/N0*/C0*C1+
   /C0*/O0*/O1*/O2*/C2*C1
4. IF(FE)CH1B=O1*O2*C2*N2*N1*/N1*/HC1*C1+

-continued

/O1*/O2*/C2*/N2*/N1*/HC1*C1+
N1*N0*C0*O0*O1*/HC1*/C1+
/N1*/N0*/C0*/O0*/O1*/HC1*C1+CH1A*/VC
5. /FC1=/C1*/CH1B*/CH1A*FE*/C1*/CH1B*VC+
/C1*FE+C1*CH1A*/VC*FE+C1*CH1B*FE
6. IF(VCC)CH2A=C3*N3*N2*N1*C1*/C2+
C1*O1*O2*O3*C3*/C2+
/C3*/N3*/N2*/N1*/C1*C2+
/C1*/O1*/O2*/O3*/C3*C2
7. IF(FE)CH2B=O2*O3*C3*N3*N2*/HC2*/C2+
/O2*/O3*/C3*/N3*/N2*/HC2*C2+
N2*N1*C1*O1*O2*/HC2*/C2+
/N2*/N1*/C1*/O1*/O2*/HC2*C2+
CH2A*/CH1B*/CH1A+CH2A*/CH1B*VC
8. /FC2=/C2*/CH2B*/CH2A*FE+
/C2*/CH2B*CH1B*FE+
/C2*/CH2B*CH1A*/VC*FE+/C2*/FE+
C2*CH2A*/CH1B*/CH1A*FE+
C2*CH2A*/CH1B*VC*FE+
C2*CH2B*FE

The filter equations will now be discussed. The PAL20L8A is used for the filter PALs. It has six I/O pins, two output pins, and fourteen input pins. It is an active-low device. Equations 1 and 2 above cause the /VC and FE signals, which are on I/O pins to always be input pins. The IF(VCC) part of equations 3 and 6 cause those I/O pins to always be output pins. Due to idiosyncrasies of the PAL ASM language and the fact the PAL20L8A is active low, the equations 5 & 8 are somewhat misleading. The FC signals need to be active high signals. Therefore, when the cell is to be unchanged, it is inverted in the equation and when it is output, it is inverted again by the PAL output driver. The net result is an unchanged bit. Conversely, when a

| PAL EQUATION NAME | PAL 1 EXTERNAL SIGNAL | PAL 2 EXTERNAL SIGNAL | SIGNAL DESCRIPTION |
|---|---|---|---|
| /VC | /VFCHG/WFCHG1 | VERTICAL CHANGE | |
| N0 | NVID3.2 | NVID1.1 | NEW SCAN VIDEO |
| N1 | NVID0.1 | NVID2.1 | NEW SCAN VIDEO |
| N2 | NVID1.1 | NVID3.1 | NEW SCAN VIDEO |
| N3 | NVID2.1 | NVID0 | NEW SCAN VIDEO |
| C0 | CVID3.2 | CVID1.1 | CENTER SCAN VIDEO |
| C1 | CVID0.1 | CVID2.1 | CENTER SCAN VIDEO |
| C2 | CVID1.1 | CVID3.1 | CENTER SCAN VIDEO |
| C3 | CVID2.1 | CVID0 | CENTER SCAN VIDEO |
| O0 | OVID3.2 | OVID1.1 | OLD SCAN VIDEO |
| O1 | OVID0.1 | OVID2.1 | OLD SCAN VIDEO |
| 01 | OVID1.1 | OVID3.1 | OLD SCAN VIDEO |
| O3 | OVID2.1 | OVID0 | OLD SCAN VIDEO |
| /HC1 | /RFCHG0 | /RFCHG2 | HORIZONTAL CHANGE |
| /HC2 | /RFCHG1 | /RFCHG3 | HORIZONTAL CHANGE |
| FE | FILTENA | FILTENA | FILTER ENABLE |
| /CH1A | — | — | SUBSET OF FILTER CHANGE 1B |
| /CH1B | /WFCHG0 | /WFCHG2 | FILTER CHANGE |
| /CH2A | — | — | SUBSET OF FILTER CHANGE 2B |
| /CH2B | /WFCHG1 | /WFCHG3 | FILTER CHANGE |
| FC0 | FVID0 FVID2 | FILTERED DATA | |
| FC1 | FVID1 FVID3 | FILTERED DATA | | cell is to be changed, it is not inverted in the equation, but is inverted by the output driver.

Several extra terms are present in the equations to allow faster operation. After the video stabilizes at the input of the PALs, it is 25 nanoseconds before CH1A and CH2A are valid in the PALs. It is 50 nanoseconds before PAL 1 CH1B & CH2B are valid. Since the VC of PAL 2 is CH2B of PAL 1, CH1B and CH2B of PAL 2 are not valid until a 75 nanoseconds delay. If the minimum equations are used, FC1 and FC2 of PAL 2 would not be valid until after a 100 nanoseconds delay which is too long for speed requirements. By duplicating the part of the change equation involving VC in the FC equations, it allows the FC1 and FC2 of PAL 2 to become valid after 75 nanoseconds.

The filter change data is output to the filter change memory 204 for use on the next scan. The upper bit of the filter change memory 204 is also output to the vertical change latch so that it may be used on the next cells to be filtered. The filtered video is output to the filtered video shift register 210 (FIG. 10).

Parameter register #1, block 260, allows subsystem microcomputer 58 to write to the filter change memory 204 when unit 44 is in the offline with filter disabled mode. It also allows subsystem microcomputer to write video into unit 44 thus replacing the video input latch 200b when unit 44 is offline. The input address counter 206, the video input latch 200b, and the filter change memory 204 data may be read via register #1, block 260.

Communications between the subsystem microcomputer 58 and the VFUFM unit 44 occur over multibus 48. Unit 44 has a jumper option which allows unit 44 to be mapped into either the multibus memory address space or the multibus I/O address space. The 'base' address for the card is determined by a PAL16C1. The base address may have a value ranging from 000000 to FFFE00 (HEX) in memory space or from 0000H to FE00H in I/O space, in increments of 0200H. This value is identical for all VFU units 40, 42, 44 and 46. Each VFU unit also has a switch selectable 'port' address which may have a value ranging from 000 to 1E0 (HEX) in increments of 020H. This value is added to the base address to form the start address for the card. For example, if the PAL is programmed for a base address of 0C000H and the switch is set to 2 (port address=040H) then the VFUFM base address will be 000040H. The individual parameter registers are at even addresses starting at the card's start address. In the above example, parameter register 0 will be at 0C040H, parameter register #1 will be at 0C042H, parameter register #2 will be at 0C044H, etc. The multibus read and write signals and address decode signal (/ACMP) are gated together and sent to a PAL16R4 along with the four least significant address bits (/ADR1-/ADR4). The PAL outputs the following signals:

| /XACK | Acknowledge to multibus master |
| /ENA 0-7 | Enables the low order register decoder |
| /ENA 8-15 | Enables the high order register decoder |
| BR/W | Controls the data bus transceiver direction |
| ADDR 1-3 | The three least significant address bits |

The enable and address bits are sent to the register decoders, which determine which of the sixteen possible parameter registers is being accessed. The bus write bit determines whether the operation is a write or read operation.

Parameter register 0, block 262, is the VFUFM unit 44 command register. Thru the command register 262, the subsystem microcomputer 58 can change the modes of the VFUFM unit 44. The master control PLS, block 264, acts on the value latched into the command register 262. The master control PLS, 264, will stop whatever it is doing when the command register 262 is written by the subsystem microcomputer 58 and will act on the new command. The master controller 264 has three main functions. It controls whether or not unit 44 is online, it controls the mode of the slave controllers (read and write), and it simulates the control signals coming from the other VFU units (including the clock) when the unit is in the offline mode. The master controller 264 implements the following commands.

0-FMRESET-VFUFM Unit 44 Reset

This command causes the master controller to set /DIAG=0 which causes the unit to be offline. It sets /BSCN=0 which will cause the clock generator U70 to synchronize. It sets the /DIAGDV=0 which allows the clock generator to run. It sets the /DIAGCMBSY=0 which inhibits the read controller 222e from unloading any data. It sets /DIAGIP=0 which indicates no document is present. It sets MCTL0=1 and MCTL1=1 which along with /DIAG0=0 tells the slave controllers to reset. It then generates eight clocks which allow the slave controllers to reset. /DIAGBSCN is set to 1 after the first clock.

1-FMORRFD-VFUFM Online Read Process Reset--Filter Disabled

This command causes the master controller 264 to set /DIAG=1, and to set MCTL0=0, MCTL1=1. It delays for 3.2 microseconds then sets MCTL1=0. The effect of this command is to cause the read controller 276 to reset and the unit is left online with the filter disabled.

2-FMORRFE-VFUFM Online Read Process Reset--Filter Enabled

This command causes the master controller 264 to set /DIAG=1, and to set MCTL0=0, MCTL1=1. It delays for 3.2 microseconds then sets MCTL1=0 and MCTL0=1. The effect of this command is to cause the read controller 276 to reset and the unit is left online with the filter disabled.

3-FMOWRFD-VFUFM Online Write Process Reset-Filter Disabled

This command causes the master controller 264 to set /DIAG=1, and MCTL0 and MCTL1=1. The controller then delays 3.2 microseconds and then sets MCTL0=0 and MCTL1=0. The effect of this command is to reset the write controller 278. The unit is left online with the filter disabled.

4-FMOWRFE-VFUFM Online Write Process Reset--Filter Enabled

This command causes the master controller 264 to set /DIAG=1, and MCTL0 and MCTL1=1. The controller delays for 3.2 microseconds and then sets MCTL1=0. The effect of this sequence is to reset the write controller 278 and to leave the unit online with the filter disabled.

11-FMDFDIS-VFUFM Diagnostic Mode With Filter Disabled

This command causes the master controller 264 to set /DIAG=0, and MCTL0 and MCTL1=0. The controller will generate a clock with each parameter register #1 write. The effect of this command is to put the VFUFM unit 44 in a diagnostic mode. The slave controllers 276 and 278 will behave as if they are online. The filter is disabled. Video is written via parameter register #1, block 260.

12-FMDFENA-VFUFM Diagnostic Mode With Filter Enabled

This command causes the master controller 264 to set /DIAG=0, MCTL0=1, and MCTL1=0. It generates a clock each time register #1, block 260, is written. The unit is in offline mode and the filter is enabled. The slave controllers 276 and 278 perform as if online. The video for the unit must be provided by writing the video into parameter register #1, block 260.

13-FMDIP-VFUFM Diagnostic Generated Item Presence

This command will cause the master controller 264 to set /DIAGIP and /DIAGBSCN=0. The DIAGBSCN will be set to 1 after one parameter register #1 (block 260) write. The effect of this command is to tell the write controller 278 that the input video is valid and the beginning of the scan is coming in two clocks.

14-FMDNIP-VFUFM Diagnostic Generated No Item Presence

This command causes the master controller 264 to set /DIAGIP=1, /DIAGBSCN=0, and /DIAGDV=0. The DIAGBSCN is set to 1 after one clock (generated by a write to the parameter register 1). The effect of this command is to tell the write controller 278 that the incoming video is invalid and the beginning of the scan is in two clocks.

15-FMDDV-VFUFM Diagnostic Generated Data Valid

This command causes the master controller 264 to set /DIAGDV=0. The effect of this command is that the clock generator U70 will be enabled to run.

16-FMDDNV-VFUFM Diagnostic Generated Data Not Valid

This command causes the master controller 264 to set /DIAGDV=1. The effect of this command is that the clock generator U70 is disabled and most of the VFUFM write process is stopped.

17-FMDWMEM-VFUFM Diagnostic Write Memory Command

This command causes the master controller 264 to set MCTL0=0, MCTL1=1, AND DIAG=0. The controller then generates three clocks and then generates a clock for every parameter register #1 write. This command causes the unit to be ready to test the filter change memory 204, center scan delay memory 208a, and the old scan memory 208b.

20-FMDWVID-VFUFM Diagnostic Write Video Memory Command

This command causes the master controller 264 to set MCTL0=0, MCTL1=1, and DIAG0=0. The controller 264 then generates 3 clocks and then 4 clocks for each parameter register #7 (block 266) write. This command is used for writing test data directly into a video memory 212 or 214 when the unit is offline.

30-FMDRMEM-VFUFM Diagnostic Read Memory Command

This command causes the master controller 264 to set MCTL0=0, MCTL1=1, AND /DIAG0=0. A clock is generated each time register #2 (block 268) or #8 (block 270) is read. The effect of this command is that the read controller 222 will enable the read address counter 222a and 222b to load while this command is present.

31-FMDBSY-VFUFM Diagnostic Generated CMBSY

This command causes the master controller 264 to set MCTL0=0, MCTL1=0 and /DIAGBSY=0. The effect of this command is that the read controller 276 will not let a new segment start the unload process. If a segment is being unloaded, it will finish unloading. A clock is generated each time parameter register #8 (block 270) is read.

32-FMDNBSY-VFUFM Diagnostic Generated CM Not Busy

This command causes the master controller 264 to set MCTL0=0, MCTL1=0, and /DIAGBSY=1. The effect of this command is that if the read controller 276 is ready to start unloading a segment, it will do so. If a segment is currently unloading, it will continue to do so. A clock is generated each time parameter register #8 (block 270) is read.

40-FMDADDL-VFUFM Diagnostic address Load

This command causes the master controller 264 to set MCTL0=0, and MCTL1=0. The clock is generated continuously. The free running clock is needed to allow the read controller to see the parameter register #4, #5 and #6 (blocks 224, 226 and 228) write pulses which occur when the card is being set up for a document unload.

Parameter register #2, block 268, allows the subsystem microcomputer 58 to read the output of the scan delay memory 202 and the filter change memory 204. The data is valid only when the board clock is not running during the register read.

The write address counter 218 provides 17 bits of addressing for the video memories 212 and 214 during the write process. The address counter 206 is reset when the first data of a document is ready to be loaded into the selected video memory 212 or 214. It increments every 368 nanoseconds (once every four times data is input).

The read cell address counter 222a provides the lower six bits of addressing for a video memory 212 or 214 during the read process. The read cell address counter 222a is initially loaded with a top cell address from parameter register #4 (block 224). Counter 222a is incremented after the end of segment is reached and the upper four bits of the video for that cell address has been unloaded.

The read scan address counter 222b provides the upper eleven bits of addressing for a video memory 212 or 214 during the read process. The read scan address counter 222b is initially loaded with the start scan address from parameter register #5 (block 226). The scan address is incremented each clock and is reloaded to the start scan address after the stop scan address has been unloaded.

The filtered data shift register 210 (FIG. 10) is used to widen the video path width from four to eight cells wide. As 4-bit-wide video is output from the filter PALs 208g and 208h, it is latched into the filtered video shift register 210 bits 4-7. On the next clock the video is moved to bits 0-3 of the shift register 210 and the next four bits of filtered video is loaded into bits 4-7 of the shift register 210. On every other clock, data is latched into the write data latches 216a and 216b. The reason the data path is widened is to accommodate the byte wide organization of the video memories 212 and 214.

The write data latches 216a and 216b provide a mechanism to route the video to the video memory currently selected to write. Only one of the latches 216a or 216b is enabled at a time since the latch enable signal on one latch is sent in the inverted form to the other latch. This prevents both memories 212 and 214 from being written simultaneously.

The memory A address select 230a enables either the write or read address signals to video memory A 212. The memory B address select 230b enables either the write or read address signals to video memory B 214. When memory A address select has the write addressing enabled to video memory A 212, memory B address select has the read addressing enabled to video memory B 214. If the memory A address select has read addressing enabled to video memory A, then memory B address select will enable the write addressing to video memory B. The select logic also provides address decode for its memory. Bit 16 of the address going to each memory may be jumpered to come from the address counters or to be always high.

The end of item comparator 222c compares the current read cell address from the read address counter 222a with the bottom cell address from parameter register #4 (block 224). For the match to occur the end of segment signal generated by end of segment comparator 222d must be active. The end of item signal generated by end of item comparator 222c is activated when the match occurs, and is used by the read controller 222e to determine when the end of the document has been reached.

The end of segment comparator 222c compares the current address from the read scan address counter 222b and the stop scan address from parameter register #6 (block 228). When the current scan address equals the stop scan address, the end of segment signal is activated. This signal is used by the read controller 276 to determine when to flag the segment end to the VFUCM unit 44.

Each of the video memories 212 and 214 consists of eight 8K-by-8 bit RAMs for a total of 64K bytes each. With scans of 512 cells, each video memory can hold 1024 scans of video. At 0.001 inch resolution, each video memory can hold a document of 10.24 inches in length. In general, one of the video memories 212 or 214 is being written with an image while the other memory is having an image unloaded to be compressed by the VFUCM unit 46. The write cycle is 368 nanoseconds in length. When the write address counter 218 is clocked, the address will be valid at the memory approximately 30 nanoseconds later. The video will be valid at the memory after approximately 6 nanoseconds. The write pulse will be activated after approximately 120 nanoseconds. The write pulse duration is 184 nanoseconds. The read cycle is 150 nanoseconds long. When the read address counters 222a and 222b are clocked on the inverted clock. The address will become stable at the memory after approximately 25 nanoseconds. The memory data will be valid after an additional 120 nanoseconds.

The read data latches 232a and 232b are transparent latches which are enabled when the true clock is high and latch the data when the true clock goes low. The data should be stable for a minimum of 5 nanoseconds.

The read data latches 232a and 232b are used not only to latch the data from the video memories 212 and 214, but are also used to select which of the memories' data is going to be read. Only one of the latches 232a or 232b is enabled at a time. The video coming out of the latches is eight bits wide and is output to the read data four bit select 232c. If unit 44 is offline, the video may be read by the subsystem microcomputer 58 via parameter register #8 (block 270).

The read data four bit select 232c is an eight bit to four bit data selector. This selector is needed since the video memory is organized as eight bits wide and the VFUCM unit 46 needs four bit wide data for its compression algorithm. The selector is controlled by the read controller 222e.

The output 234 latches the four bit video and the four control bits going to unit 46. These signals are latched to insure that the data being transferred is synchronized properly.

The read controller 222e manages the entire document unload process. The read controller 222e is a slave to the master controller 264. Signals from the master controller controls the mode of the read controller. The three signals are MCTL0, MCTL1, and ONLINE0. At power up or reset the read controller goes to state 3F and then to state 3E. The BEGINDOC (beginning of document), BEGINSEG (beginning of segment), ENDSEG (end of segment), ENDDOC (end of document), and NIBSEL (nibble or four bit select) are set to 0. The /RDADDENA0, /RDADDLD0, and /RDADDLD1 are set to one. If MCTL0=1, MCTL1=1, and /ONLINE0=1, or MCTL0=0, MCTL1=1, and /ONLINE0=0, the read controller is being reset by the master controller and will stay in state 3E since the controller is in its initialized state. If MCTL0=0, MCTL1=1, and ONLINE0=1, the read controller is put in memory diagnostic mode. The controller will go to state 6 and set /RDADDLD0=0 and /RDADDLD1=0. This will allow the read address counters 222a and 222b to be set to any address desired by the unit microcomputer. The read controller will go back to state 6 and set RDADDLD0=1 and /RDADDLD1=1 when the MCTL0, MCTL1, or ONLINE0 change values. If MCTL0, MCTL1, and ONLINE0 are any other combination than those outlined above, the read controller thinks that it is online. The remainder of the discussion will be on the "online" operation of the read controller.

The read controller 222e waits in state 3E until subsystem microcomputer 58 writes parameter register #4 (block 224). When this happens, the read controller 222e will go to state 4 and it sets /RDADDLD0=0. This allows the read cell address counter 222a to load the start cell address. The read controller 222e will wait until the subsystem microcomputer 58 writes to parameter register #5, block 226, and then go to state 5 and set /RDADDLD0=1 and /RDADDLD1=0. This action will finish the read cell address counter load and will allow the read scan address counter 222b to load. The read controller 222e will then wait until subsystem microcomputer 58 writes to parameter register #6 (block 228) and then go to state 0 and set /RDADDLD1 to 1. This will complete the read scan address counter load. It should be noted that the read controller 222e will not respond to a master controller 264 reset in states 4 or 5. In state 0, the read controller 222e will reset (go to state 3E and reinitialize output signals) if the MCTL0=1, MCTL1=1, /ONLINE0=1 or MCTL0=0, MCTL1=1, /ONLINE0=0 conditions occur. Otherwise, the read controller will wait for the CMBSY to =1 which indicates the VFUCM unit 46 is ready to receive a segment. When this occurs, the read controller 222e will set /RDADDENA0=0 and go to state 1. This action will allow the read scan counter 222b to increment. The read controller 222e will then set BEGINDOC and BEGINSEG=1 and go to state 2. This action will tell the VFUCM unit 46 that a new document is being unloaded. The NIBSEL is 0 so the lower four bits video being unloaded is sent to the VFUCM. On the next clock, the read controller 222e will set BEGINSEG and BEGINDOC=0 and go to state 3. Note that the read counter 222a only will be incrementing during the unload.

The unload will continue until the signal generated by the end of segment comparator 222d is 0. The controller 222e will then go to state 14 and set NIBSEL, ENDSEG, /RDADDENA0 to 1 and /RDADDLD1 to 0. The effect of this action is to tell the VFUCM unit 46 that the last of the segment data has been unloaded to it. The read scan address counter 222b will be reloaded with the start scan address. The read data four bit select 232c is set to unload the upper four bits of video on the next segment. On the next clock ENDSEG is set to 0 and /RDADDLD1 is set to 1 and the controller 222e goes to state 10.

The read controller 222e will wait for the /CMBSY to be 1 before any more data will be unloaded. When CMBSY is 1, the controller 222e will set RDADDENA0=0 and go to state 11. This will allow the read scan address counter 222b to increment. On the the next clock the controller 222e will set BEGINSEG=1 and go to state 12. This will tell the VFUCM unit 46 that a new segment is starting to unload. On the next clock, the controller 222e will set BEGINSEG=0 and go to state 13. During state 13, the read controller 222e will respond to a reset command from the master controller 264 by going to state 3E and reinitializing its outputs. If the reset command is not present, the read controller will wait until /EOS =0. At this time, if /EOI, which is generated by the end of item comparator 222c, is also 0, the controller 222e will set ENDDOC, ENDSEG and /RDADDENA0 to 1 and NIBSEL to 0, and then go to state 15. This will tell the VFUCM unit 46 that the last of the document's video has been unloaded. On the next clock, the controller will set ENDSEG and ENDDOC to 0 and go to state 3E.

If /EOI is 1, the controller 222e will set NIBSEL, and /RDADDLD1 to 0 and ENDSEG to 1. The effect of this action is that the VFUCM unit 46 will know that the last of the segment's data has been unloaded, the read cell address counter 222a will increment, and the read scan address counter 222b will reload to the start scan value. The read controller 222e will go to state 24. On the next clock, the read controller will set /RDADDENA0 and ENDSEG to 1 and ENDSEG to 0 and go to state 20.

The read controller 222e will respond to a master controller 264 reset command in state 20 by going to state 3E and reinitializing its outputs. If no reset command is present, the read controller 222e will wait until the /CMBSY is 1. At that time, it will set the /RDADDENA0 to 0 and go to state 21. On the next clock, the read controller 276 will set BEGINSEG to 1 and go to state 22. This action will tell the VFUCM unit 46 that a new segment is starting to unload. On the next clock, the controller will set BEGINSEG=0 and go to state 23. The lower four bits of the video unloading will be sent to the VFUCM unit 46. In state 23, the read controller 222e will respond to a master controller reset command by going to state 3E and reinitializing the controller outputs. If a reset command is not present, the read controller will wait until the /EOS is 0. At that time, it will set NIBSEL, /RDADDENA0, and ENDSEG to 1 and /RDADDLD1 to 0 and go to state 14. This action will tell the VFUCM unit 46 that the last data of the segment has been unloaded.

It will also reload the read scan address counter 222a with the start segment and will set up the read data four bit select to unload the upper four bits of video on the next segment. The processing continues as described for state 14 above.

VIDEO FORMAT UNIT
VIDEO COMPRESSOR UNIT

FIGS. 11-14 Overview

The video compressor unit 46 (FIG. 2) receives four bits of correlated video from the video filter and memory unit 44, compresses it, formats it into a continous 16-bit field, and then writes the data into the system's global memory.

Compression is achieved by counting the number of times the data pattern repeats itself, then storing the data pattern and the repeat count. The data pattern is stored as a four bit field, while the repeat count is stored as a variable length field (1 to 15 bits). The pattern-repeat count sets are merged together in consecutive 16-bit words and written into the system's global memory.

Compression typically results in a 4:1 data reduction. In extreme cases (all patterns the same and alternating patterns), this method of compression can result in compression ratios of 50:1 and 4:5, respectively.

The compression algorithm is used to pack the maximum amount of data into the minimum amount of memory. In order to achieve this compression, each four bit video field is compared with the previous four bit field and the repeats are counted. This process continues until either the pattern stops repeating or a count of 255 is reached. In either case, the pattern along with the repeat count is stored in system memory. The pattern is stored directly as a four bit field, while the repeat count is stored as a variable field (1 to 15 bits).

The method of storing a variable repeat count is as follows: The repeat count is broken up into three fields, the modulo field, the separator field, and the remainder field. The modulo field is a variable length field (0 to 7 bits) where all the bits contained within this field are a logic 1 (high). The separator field is a single bit field that separates the modulo count from the remainder count. The separator bit is always a logic 0 (low). The remainder field always contains the same number of bits that the modulo field contained and can be a mixture of 1's and 0's. When the modulo count is added to the remainder count, the total repeat count is obtained.

There are four control signals that are used to define document placement. They are the beginning of document (BOD), beginning of segment (BOS), end of segment (EOS) and end of document (EOD) signals. The control signals BOS and EOD have a 26 bit code associated with it that is placed into the output data stream before the data is written into global memory. These codes are (2FFFFFFH) for BOS and (0FFFFFFH) for EOD. The reason for using such a long code is to uniquely identify the control codes from the data pattern and the repeat count. The other two control signals BOD and EOS are strictly used for data preparation.

The video compressor unit 46 (VFUCM) contains two segment memories which allow input and output operations to run simultaneously. Separating the input from the output is necessary in order to maintain the speed at which the document must be processed.

Figure 11:
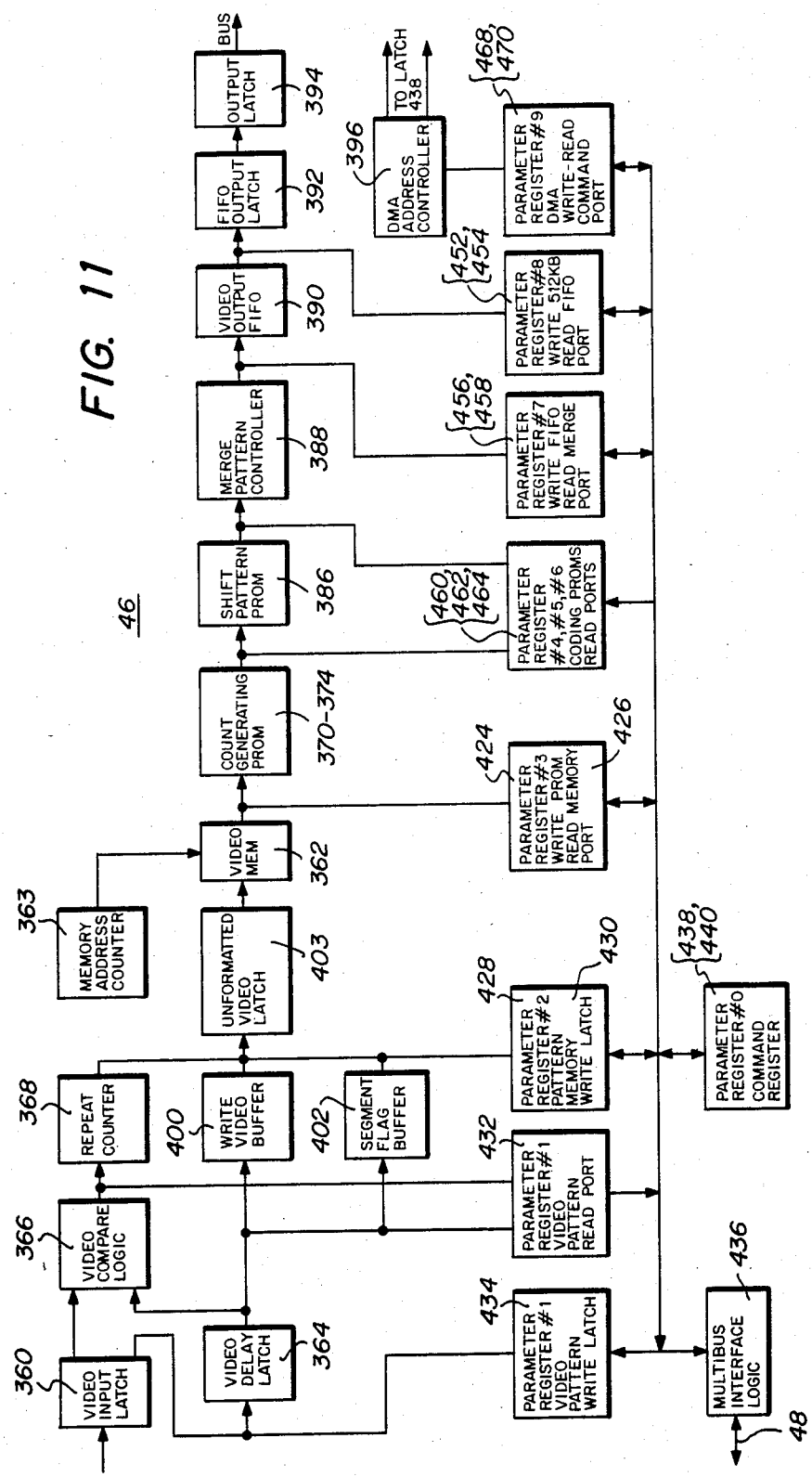
FIG. 11 is a functional block diagram of the video compressor unit shown in FIG. 2.

The input process of compressor unit 46 starts out by zeroing the address and repeat counters and placing memory "A" in the input mode and memory "B" in the output mode. Unit 46 then waits for the control signals BOD and BOS to be received. These control signals, along with the four bits of video, are latched into the video input latch 360 (FIG. 11). The control signals are then stripped off and latched into the memory "A" write data latch 362 where they will be written into memory on the next clock under control of the write controller. The video pattern will be clocked into the video delay latch 364 and new video will be clocked into the video input latch 360. The two video patterns are checked for equality by the video comparator 366 and if they are equal, the output of the comparator will increment the repeat counter 368.

Each new pattern will be compared in this manner and the counter 368 will continue to be incremented until a count of 255 is reached or the patterns become unequal. In either case, the video pattern along with the repeat count, which is an eight bit binary count, is stored into memory, and the repeat counter 368 is loaded to a value of one and will start incrementing again. This process will continue until the control signal EOS is received. When this signal is received, memory "A" and memory "B" of video memory 362 will exchange functions. Memory "B" will be placed in the input mode and memory "A" will be placed in the output mode. When the memories exchange functions, the counters are zeroed and input starts upon receiving BOS. This process continues until EOD is received. At this time, the unit 46 will reintialize all counters and wait for the next BOD-BOS sequence.

Figure 13:
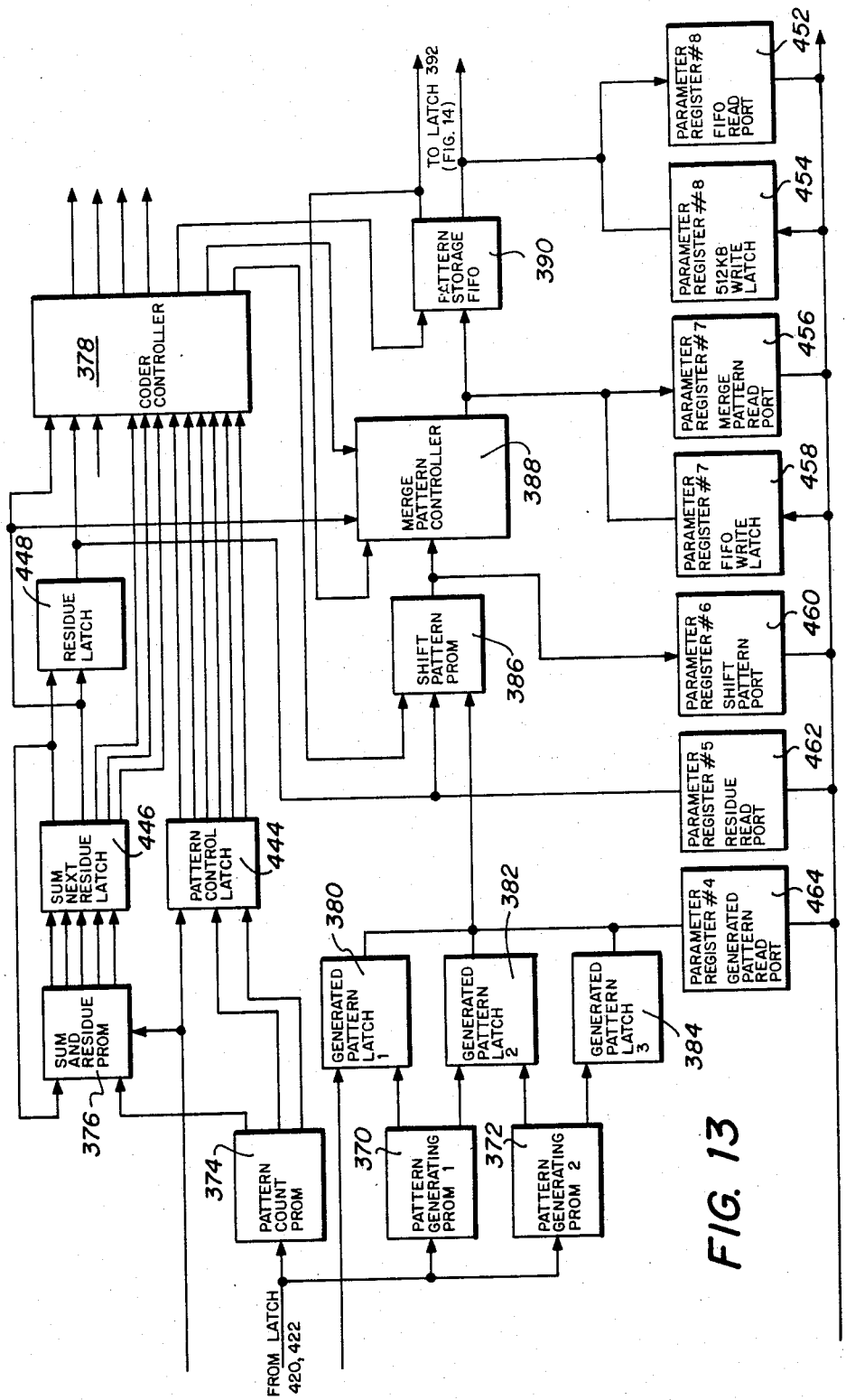

The output process starts when the two segment memories exchange functions. Data is read out of the appropriate memory and is latched into the memory output latch. The data read out of memory is formatted in the following way. Bits 0-7 contain the binary repeat count, bits 8-11 contain the video pattern, and bits 12-15 contain the control bits (BOD, BOS, EOS, and EOD). Data bits 0-7 are sent to the pattern generating PROMs 370, 372 (FIG. 13) and to the pattern count PROMs 374 (FIG. 13). The pattern count PROMs 374 calculates the length of the count field and the pattern generating PROMs 370, 372 convert the binary count into the modulo and remainder count.

The output of the pattern count PROM goes to the sum and residue PROM 376 (FIG. 13) which keeps a running count of the length of the data field. This data is used by coder controller 378 to decide which direction and how much to shift each pattern in order to obtain a continuous eight bit field. The outputs of the pattern generating PROMs 370, 372 along with data bits 8-11 are latched into the generated pattern latches 380, 382, 384. The coder controller 378 (FIG. 13) then sequences through these latches, outputting the data into the shift pattern PROM 386 (FIG. 11). The shift pattern PROM 386 then shifts the data in the appropriate direction in order to get a continuous eight bit field. This output is then sent to the merge pattern controller 388 where the actual merge takes place.

After the data is merged together forming a continuous eight bit field, the data is written into the pattern storage FIFO's 390. The data is then read out of the FIFO's 390 and latched into the FIFO output latches 392 where the data is converted into a 16-bit word. The 16-bit word is then latched into the data output latch 394 where it is then written into the system's global memory.

Before compression begins, the system controller 28 must load the global memory's start address along with the maximum word count into the DMA address controller 396. This information specifies where and how much memory the compressed data may occupy. If the data requires more memory than was allocated, and the maximum word count decrements to zero, a flag will be sent to the system controller indicating that the image stored in memory is incomplete. The VFUCM 46 will then be reintialized and wait for the next BOD-BOS sequence.

Detailed Description

FIGS. 11-14

Figure 12:
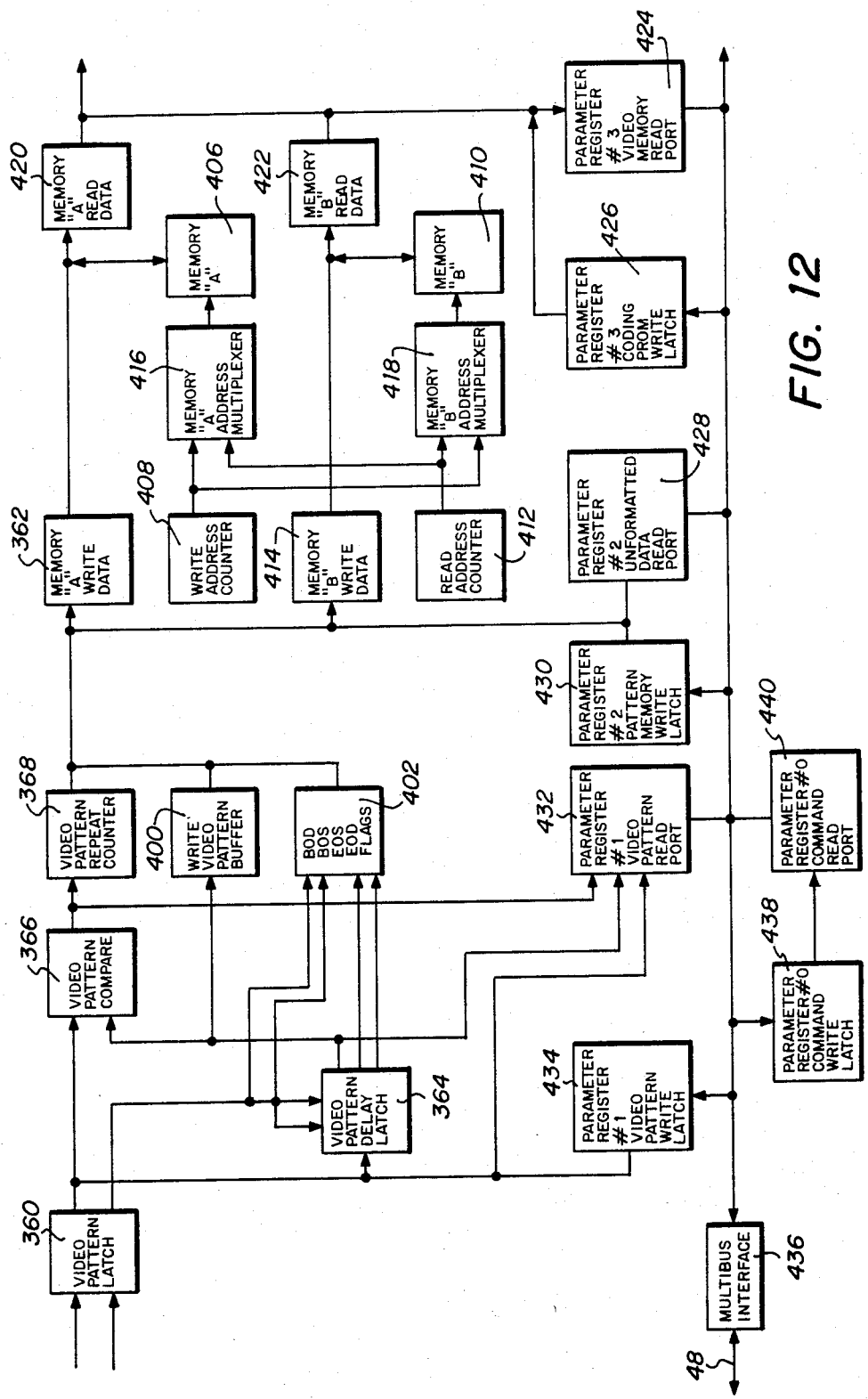
FIGS. 12-14 are detailed block diagrams of the video compressor unit shown in FIG. 11.

Referring simultaneously to FIGS. 11 and 12, the video compressor unit 46 (VFUCM) receives via latch 360 eight bits of data from the video filter and memory unit 44 (VFUFM) every 150 nanoseconds. The eight bits of data are made up of four bits of video and four control bits. The control bits describe the positioning of the video to the document. The control bits are BOD (beginning of document), BOS (beginning of segment), EOS (end of segment), and EOD (end of document). When the unit 46 is initially powered up, the signal CLRIL (clear input latch) from the write controller forces the output to zero. The signal CLRIL is then removed and the write controller then monitors latch 360 waiting for the signal BOD. Once this signal is received, the data compression process begins.

The video delay latch 364 receives its data from the video input latch 360, and delays the data by one clock. This allows the comparison of two consecutive scans. Two of the control lines (EOS and EOD) are also latched into latch 364 while the other two (BOD and BOS) are not. The reason for this operation is that video data is sent to the input latch 366 in the same byte as BOD and BOS. When the data is written into the segment memory, by not latching these two control bits, they are written into memory one clock ahead of the video. This gives control bit separation in memory.

The video comparator 366 receives its data from the video input latch 360 and the video delay latch 364. Comparator 366 compares the two 4-bit data patterns for equality. If they are equal, the signal AEQUB goes to a logic 1. This signal goes to the write controller to tell it when data is ready to be written into memory. Whenever the two data patterns are not equal, the signal goes to a logic 0 and the data in the video delay latch 364 along with the repeat count will be written into one of the segment memories.

The video buffer 400 and control data 402 buffer is an 8-bit buffer that provides a means of tristating the input latches for diagnostics. The output of either buffer 400 or 402 is applied through a latch 403 to memory 362 and allows diagnostic data to replace the actual data generated from the repeat counter 368 and the video delay latch 364.

The video repeat counter 368 is an 8-bit binary counter that is incremented each time the two data patterns are equal.

Memory "A" write data latch 404 is a 16-bit latch that latches the repeat count, video pattern, and the control bits before they are written into segment memory "A" block 406. Latch 404 is enabled by a signal which is generated by the write controller.

The write address counter 408 supplies the address to both segment memories 406 and 410 during the write cycles. Each time the write controller receives the control signal EOS, it will generate a load write and read address counter. This signal will load both the write 408 and read 412 address counters with a value of zero. Once the counters 408 and 412 are initialized, after each write cycle, the write controller will generate a write counter increment signal which will increment the counter by one. The counter will continue to increment until the next EOS is received where it will be reloaded to a zero and continue the same process on the next segment.

Memory "B" write data latch 414 is a 16-bit latch that latches the repeat count, video pattern, and the control bits before they are written into segment memory "B" 410. Latch 414 is enabled by a signal which is generated by the write controller.

The read address counter 412 supplies the address to both segment memories 406 and 410 during the read cycles. Each time the write controller receives the control signal EOS, it will generate a load write and read address counter. This signal will load both the write and read address counters with a value of zero. The read address counter increment signal RCINC is controlled by the coder controller 378 (FIG. 13).

The cycle starts by loading segment memory "A", block 406. Once this memory is loaded, the write controller will exchange memories and write the next segment into memory "B", block 410, while the coder controller 378 will start reading out of memory "A". Each time the coder controller requires the next word out of memory, it will issue a read counter increment.

Memory "A" address multiplexer 416 selects which address segment memory "A" 406 will receive, write or read. The signal write memory "A" enable, generated by the write controller, is used to determine which set of address counters (write or read) will be used to drive memory "A". If this signal is at a logic 0, memory "A" will be placed in the write mode and memory "B" will be placed in the read mode.

Memory "B" address multiplexer 418 selects which address segment memory "B" 410 will receive, write or read. The signal write memory "A" enable, generated by the write controller, is used to determine which set of address counters (write or read) will be used to drive memory "A". If this signal is at a logic 1, memory "B" will be placed in the write mode and memory "A" will be placed in the read mode.

Segment memory "A" 406 is made up of two (2 K by 8) static RAMs. The RAMs are organized to yield 2 K words of memory. The format of each word is as follows: Bits 0-7 are the repeat counts, bits 8-11 are the video, and bits 12-15 are the control bits.

Segment memory "B" 410 is made up of two (2K by 8) static RAMs. The RAMs are organized to yield 2K words of memory. The format of each word is as follows: Bits 0-7 are the repeat counts, bits 8-11 are the video, and bits 12-15 are the control bits.

Memory "A" read data latch 420 is made up of two 74LS380 octal latches. These latches are strapped to run in only two modes, load and disable input. The write controller controls the output enable. When memory "A" 406 is in the write mode, the output of latch 420 is disabled. During the read mode, the coder controller 378 (FIG. 13) controls the load and input disable with the signal latch enable. When this signal is at a logic 0, the counter is in the load mode of operation. At each rising edge of the clock, new data is latched into the latches. When LTCHEN goes to a logic 1, the previous data will be locked into the latches and the clock will not affect its output. This provides the coder controller 378 a method of stopping data output from the memory without affecting the integrity of the data previously latched.

Memory "B" read data latch 422 is made up of two 74LS380 octal latches. These latches are strapped to run in only two modes, load and disable input. The write controller controls the output enable. When memory "b" is in the write mode, the output of latch 422 is disabled. During the read mode, the coder controller 378 (FIG. 13) controls the load and input disable with the signal latch enable. When this signal is at a logic 0, the latch is in the load mode of operation. At each rising edge of the clock, new data is latched into the latches. When LTCHEN goes to a logic 1, the previous data will be locked into the latches and the clock will not affect its output. This provides the coder controller a method of stopping data output from the memory without affecting the integrity of the data previously latched.

When the VFUCM unit 46 is initially powered up, the write controller is initialized to select memory "A", block 406, for the write process and it holds both output latches, (memories "A" and "B"), in a clear state with the signal CLROML (clear output memory latch). As soon as the controller receives the signal BOS, it will send the write enable (WENA) signal to write the BOS code into memory. Once the code is stored, it will increment the write address counters and start monitoring the signal AEQUB. As soon as AEQUB goes to a logic 0, the write controller will issue another write. This process continues until the control signal EOS is received. Upon receiving EOS, the controller writes it into memory and then exchanges memory functions. Memory "A" will now be in the read mode and memory "B" will be in the write mode. Once the two memories exchange functions, the signal CLROML will be removed and not issued again until the control signal BOD is received. The two memories will continue to exchange functions until the signal EOD is received. Once received, the write controller will reinitialize itself (the same as power up) and wait for the next BOS.

Parameter register #3, blocks 424 and 426, is the segment memory output port and the coding PROMs input port. When the unit 46 is in the diagnostic mode, data that is written to parameter register #3, block 426, will be received by the coder PROMs (FIG. 13). This provides a method of bypassing the segment memories 420, 422 and entering diagnostic data directly to the coding PROMs. Reading from parameter register #3, block 424, will allow the diagnostics to read the data that is stored in either segment memory 420, 422.

Parameter register #2, blocks 428 and 430, is the repeat count, video data, and control bits' output port and the segment memories' input port. When the unit 46 is in the diagnostic mode, data that is written to parameter register #2, block 430, will be written into one of the segment memories (whichever memory the write controller has enabled). Reading from parameter register #2, block 428, will allow the diagnostics to read the repeat counter, video data, and the control bits.

Parameter register #1, blocks 432 and 434, is the video pattern latch output port and the delayed video latch input port. When the unit 46 is in the diagnostic mode, data that is written to parameter register #1, block 434, is latched into the video delay latch 364 and placed at the input of the video comparator 366. Reading from parameter register #1, block 432, allows reading the video data and control bits that are input to unit 46.

Communications between the subsystem microcomputer 58 and the VFUCM unit 46 occur over multibus 48. The unit 46 has a jumper option which allows the unit 46 to be mapped into either the multibus memory address space or the multibus I/O address space. The "base" address for the unit 46 is determined by a PAL16C1. The base address may have a value ranging from 00000H to FFFE0H in memory space or from 0000H to FE00H in I/O space, in increments of 200H. This value is identical for all VFU units. Each VFU unit also has a switch selectable "port" address which may have a value ranging from 0H to 1E0H in increments of 20H. This value is added to the base address to form the start address of the unit. For example, if the PAL is programmed for a base address of C000H and the switch is set to 2 (port address =40H), then the VFUCM base address will be C040H. The individual parameter registers are at even addresses starting at the unit's start address. In the above example, parameter register #0 will be at C040H, parameter register #1 will be at C042H, register #2 will be at C044H. The multibus read and write signals and address decode signal are gated together and sent to PAL16R4 along with the four least significant bits of the address. The PAL outputs the following signals:

| /XACK | Acknowledge to multibus master |
| --- | --- |
| /ENA 0-7 | Enables the low order registers |
| /ENA 8-15 | Enables the high order registers |
| BR/W | Controls the data bus transceiver direction |
| ADDR 1-3 | The three least significant address bits. |

The enables and the three LSB's of the address are sent to the register decoders, which determine which of the 16 possible parameter registers is being accessed and (BWT) determines whether the operation is a read or write operation.

Parameter register #0, blocks 438 and 440, is the VFUCM command register. All onboard commands are received and sent to the proper controllers through this register. This register is used "online" as well as "offline". When the VFUCM unit 46 is online, the command to load the global memory starting address as well as the maximum word count is latched into register #0 and the DMA master controller responds by loading the values into the 2940 DMA address controllers 396 (FIG. 11). When the VFUCM unit 46 is "offline", all diagnostic commands are latched in this register and the proper controller will respond by executing the command.

Referring simultaneously to FIGS. 11 and 13, the pattern count PROM 374 is a 512 by 8 field programmable ROM. It receives its input from the segment memories' output latches 420, 422 (FIG. 13). The data received is actually the repeat count that has been stored in one of the segment memories, blocks 406, 410. The pattern count PROM 374 outputs to PROM 376 the total number of bits contained within the modulo count field, and two bits to latch 444 that tells if the total pattern (video, modulo, separator, and remainder) is larger than 8 or larger than 16 bits, respectively. For example: If the video pattern repeated for 16 scans, the modulo count, separator, and remainder would be equal to (0000-0-1111). The total number of bits contained within the modulo field would be equal to 4 and the total pattern bit count would be greater than 8 but less than 16. The output of the PROM 374 would then be equal to 0CH. For each binary repeat count, a "pattern count" is generated in order to merge the resulting pattern into a continuous 16 bit field.

The pattern generating PROMs 370, 372 are made up of two 512 by 8 field progammable ROMs. They receive their inputs from one of the segment memories' output latches 420, 422. The data is actually the binary repeat count that is stored in the segment memories 406, 410. The pattern generating PROMs 370, 372 transforms the binary repeat count into a modulo field, separator field, and remainder field. The modulo field is a variable field (from zero to seven bits), whose bits are always a logic 1. The separator field is a single bit field whose bit is always a logic 0, and the remainder field is a variable length field whose length is always equal to the modulo field length. The modulo field is calculated by finding the largest power of two that will subtract from the binary count. The modulo count is then equal to this value minus one. The value remaining after the initial subtraction is the value of the remainder before the bit reversal. The remainder field is bit reversed where the bit position of the MSB becomes the bit position of the LSB. For example: If the binary count is equal to 1AH, the largest power of 2 that will subtract into it is 16H. Taking this value and subtracting one from it will yield a modulo count field of (1111 - binary). The value left over from the initial subtraction is 0AH, bit reversing this will yield a remainder field of (0101 - binary). The total count field is then equal to (010101111 - binary), which will be the output of the pattern generating PROMS 370, 372.

The sum and residue PROM 376 is a 512 by 8 field programmable ROM. It receives its inputs from the pattern count PROM 374 and the sum and next residue latch 446. PROM 376 keeps track of how many bits have been used in each 8 bit byte. This information is required for merging each pattern-count field into continuous 8-bit bytes. The sum and residue PROM 376 takes the old residue bit count and, from the pattern bit code, calculates a new residue bit count. Along with the new residue bit count it outputs three bits to latch 446 that tell the coder controller 378 how many bits the total pattern occupies (SBC>8A, SBC>16A, and SBC>24A), and one bit to latch 446 showing if the residue bit count equals 0 (RBCEQOA).

When the sum and residue PROM 376 receives the control signal BOS, it forces the residue bit count to two. This is because the actual code for BOS that is output, requires 26 bits to code (four bytes +two bits remaining). These two bits must be merged into the next output byte. For example, suppose the residue bit count is equal to 2 and the next pattern requires 11 bits (four bits of video and seven bits of count), the pattern bit code would be equal to 3 (number of bits in the modulo count). The inputs to the sum and residue PROM would be RES.00B=0, RES.01B=1,RES.02B=0, PCOD.00=1, PCOD.01=1, and PCOD.02=0. The resulting output would be a residue bit count of 5 (two previous bits + six of the 11 current bits makeup the output byte, with five bits left over), and the pattern would be greater than 8 but less than 16, so the other outputs would be SBC>8A=1, SBC>16A=0, and SBC>24A=0. Say the next pattern read out of memory required 13 bits (four bits of video and nine bits of count). The pattern bit code would be equal to 4 (number of bits in the modulo count). The inputs to the sum and residue PROM 376 would be RES.00B=1, RES.01B=0, RES.02B=1, PCOD.00=0, PCOD.01=0, and PCOD.02=1. The resulting output would be a residue bit count of 2 (five previous bits + three of the 13 current bits makeup one output byte, then eight more bits of the 13 current bits for another output byte, with two bits left over), and the pattern is greater than 8, but less than 16, so the other outputs would be SBC>8A=1, SBC>16A=0, and SBC>24A=0. This process will continue in the same manner until the next "BOS" control bit is received. At this time, the residue bit count is forced back to a 2 and the process starts over.

The sum and residue latch 446 is a 74LS380 octal latch with input enable. This latch is used to delay the output of the sum and residue PROM 376 by one clock. This latch operates in two modes, load and input enable. The input enable signal (/LTCHEN) is generated by the coder controller 378. This enables the coder controller 378 to stop the flow of data without destroying the validity of the data. Three of the output bits are fed back to the sum and residue PROM 446 as the residue bit count bits. These bits, along with RBCEQOB (residue bit count equals zero), are also fed to the residue latch 448. Each time the coder controller 378 is ready to merge the next video pattern, it will enable the latches (/LTCHEN=0), which will enable the next pattern to pass through coding PROMs for processing.

The pattern control latch 444 is a 74LS380 octal latch with input enable. This latch is used to delay the outputs of the pattern count PROM 374 (PBC>8A and PBC>16A) along with data bits 12 through 15 from the segment memory output latches 420, 422. These data bits are actually the control bits (BOD, BOS, EOS, and EOD), respectively. The outputs of this latch are sent to the input of the coder controller 378 for process control.

The pattern generating latches 380, 382, 384 are made up of three 74LS380 octal latches with input enable. These latches are used to latch the outputs of the pattern generating PROMs 370, 372 along with the video pattern. Each latch is enabled with its own enable signal, respectively. The coder controller 378 controls these signals and selects which one to enable based upon the signals (SBC>8B, SBC>16B, SBC>24B, PBC>8B, and PBC>16B). Pattern latch 1, block 380, contains the four video bits and the first four bits of the count field (modulo, separator, and remainder). Pattern latch 2, block 382, contains the next eight bits of the count field and pattern latch 3, block 384, contains the last four bits of the count field. The coder controller 378 starts each merge operation with pattern latch 1 enabled. The two signals (PBC>8B, and PBC>16B) controls which latch, if any, are going to be enabled next (latch 2 or 3). If PBC>8B =1, the coder controller 378 will enable pattern-latch 2 after the data out of latch 1 has been latched. If PBC>16B=1, the coder controller 378 will latch the data out of latch 1 into the merge controller, enable latch 2, latch the data into the merge controller, then enable latch 3, and latch the data into the merge controller. This process takes a maximum of four clock cycles to complete.

The residue latch 448 is a 74LS380 octal latch with input enable. It delays the residue bit count (RES.00B - .02B) by one clock so that the shift pattern PROM 386 will be synchronized with the coder controller 378. The coder controller 378 bases its decision of the direction of shift on the signals while the shift pattern PROM 386 bases its decision of how much to shift on the signals (RES.00C - .02C). The clock cycle that latches the coder controller's output SHBIR (shift direction) is also the clock that latches the signals (RES.00C - .02C) output from latch 448.

The shift pattern PROM 386 is a 4K-by-8 field programmable ROM. Its input bits are as follows: Bits 0-7 are the outputs of the generated pattern latches 380, 382, 384, bits 8-10 are from latch 448, and bit 11 is the signal (SHDIR) from the coder controller 378. When (SHDIR=0) the direction of shift is to the left (LSB to MSB) and when (SHDIR=1) the direction of shift is to the right (MSB to LSB). The three residue bits (RES.00C - RES.02C) determine the number of bits to shift the data and the 8 data bits (GENP.00 - GENP.07) are the outputs of the generated pattern latches. The table given below shows the relationship of inputs to outputs.

| SHDIR | RES.00C-.02C | GENP.00-.07 | Output |
|---|---|---|---|
| 0 | 0 | 87654321 | 87654321 |
| 0 | 1 | 87654321 | 76543210 |
| 0 | 2 | 87654321 | 65432100 |
| 0 | 3 | 87654321 | 54321000 |
| 0 | 4 | 87654321 | 43210000 |
| 0 | 5 | 87654321 | 32100000 |
| 0 | 6 | 87654321 | 21000000 |
| 0 | 7 | 87654321 | 10000000 |
| 1 | 0 | 87654321 | 87654321 |
| 1 | 1 | 87654321 | 00000008 |
| 1 | 2 | 87654321 | 00000087 |
| 1 | 3 | 87654321 | 00000876 |
| 1 | 4 | 87654321 | 00008765 |
| 1 | 5 | 87654321 | 00087654 |
| 1 | 6 | 87654321 | 00876543 |
| 1 | 7 | 87654321 | 08765432 |

The merge pattern controller 388 functions to merge the data from each pattern-count sequence, which can range from 5 to 19 bits, into continuous 8-bits bytes. Its inputs consist of the following signals: 8 bits of data from the shift pattern PROM 386, 4 state bits from the coder controller 378, FIFO input ready from FIFO 390, and residue bit count equal zero (RBCEQOC). The load and merge process of the merge pattern controller 388 is based upon the coder controller state bits. States 8, 10, and 12 load, while states 9, 11, and 13 merge. When the coder controller 378 is in state 8, 10, or 12, and the number of new data bits are less than or equal to the number of free data bits in the merge controller, the data will just be loaded and transferred to the output. On the other hand, if the coder controller 378 is in state 8, 10, or 12, and the number of new data bits is greater than the number of free data bits in the merge controller, it will fill the rest of the current byte, transfer its output to the output FIFOs 390, load the rest of the new input data, and zero all unused bits. The zeroing must take place because the merge pattern controller simply OR's the new data with the old data.

The coder controller 378 is made up of a 82S105 programmable logic sequencer and a 82S100 programmable logic array. These two devices are tied together to form a single master controller for the coding and merging processes. The controller's 14 states (state 0 through state 13), are divided up into two functions. States 0 through 7 function as the coding states for "beginning of segment" and "end of document" while states 8 through 13 function as the coding and merging states for the video data. The following is a description of each state and the control signals which are generated within that state.

State 0—In state 0, the coder controller enables the segment memory output latches (/LTCHEN=0) and looks for the control signal BOD. Once received, the controller moves into state 1.

State 1—In state 1, the coder controller sets the FIFO input ready flip-flop with the signal (SIRDYJ=0) which will enable the merge pattern controller to write the "beginning of segment" or "end of document" code into the output FIFOs. The coder controller also removes latch enable (/LTCHEN=1) which holds up the video while the merge pattern controller does the coding.

State 2—In state 2, the coder controller checks to see if the residue bit count is equal to zero (RBCEQOC=0) or if it is at the beginning of document. If either of these conditions are true, the controller moves to state 4 and bypasses state 3. State 3 is only needed when another clock cycle is required to finish the merge process of the last video pattern from the previous segment.

State 3—State 3 is simply a delay state that adds one clock cycle in order to finish the merge process of the last video pattern from the previous segment.

State 4—In state 4, the coder controller resets the FIFO input ready flip-flop (/SHRDYK=0). This disables any data from being written to the FIFOs. It then enables the segment memory output latches (/LTCHEN=0) and allows the video data to begin the coding process. The controller then checks the two control signals BOS and EOD. If it is the beginning of document, it increments the read address counters (RCINC=1) and moves to state 6, where the merge pattern controller will finish coding the beginning of segment. If the control signal is end of document, the controller moves to state 5, where the merge pattern controller will finish coding the end of document.

State 5—In state 5, the coder controller enables the FIFO input ready flip-flop (SHRDYJ=1). This is to allow the last byte from the merge pattern controller, the code for end of document, to be written into the FIFOs. The controller then returns back to state 0 and waits for the next BOD.

State 6—State 6 is a delay state for the video data to be latched into the segment memory output latches.

State 7—State 7 is a delay state for the video data to be latched into the sum and next residue latch, the pattern control latch, and the generated pattern latches (1, 2, and 3).

State 8—In state 8, the coder controller checks the control signal EOS. If EOS is a logic 1, the controller returns back to state 1 to start the next segment or to start a new document. If EOS is a logic 0, it checks two signals RBCEQOC and SBC>8B. If both are zero, the controller stays in state 8 and the merge controller simply loads the pattern. If the sum bit count is greater than 8 (SBC>8B=1), and the residue bit count does not equal zero (RBCEQOC=0), the controller will load as much data as it can into the merge pattern controller (until it is full), and move to state 9. If both bits are at a logic 1 (SBC>8B=1 and RBCEQOC=1), the controller will load the data into the merge pattern controller and move to state 10 where it will output the data to the output FIFOs and load the merge pattern controller with the data contained in generated pattern latch 2.

State 9—In state 9, the coder controller disables the output latches and enables the FIFO input latch to load the FIFOs with the data contained within the merge pattern controller. It then checks to see if the pattern bit count is greater than 8 (PBC>8B=1). If it is not, the controller outputs the signal SHDIR which tells the shift pattern PROM to shift the data left, and returns back to state 8 to load the rest of the data pattern. If the pattern bit count is greater than 8, the controller enables generated pattern latch 2 (/ENPL.2) and sets (SHDIR). It then moves into state 10 where this data will be loaded into the merge pattern controller.

State 10—In state 10, the coder controller loads the data from generated pattern latch 2 into the merge pattern controller. It then checks the two signals (RBCEQOC) and (SBC>16B). If both of them are at a logic 0, the controller returns back to state 8 and enables the output latches (/LTCHEN=0). If (RBCEQOC=1) and (SBC>16B=1), the controller moves to state 12 where it will load the merge pattern controller with the data that is contained in generated pattern latch 3. If (RBCEQOC=0) and (SBC>16B=1), the controller will move to state 11 where it will output the signal (SHDIR) before loading the merge pattern controller with the rest of the data from generated pattern latch 2.

State 11—In state 11, the coder controller disables the output latches and enables the FIFO input latch to load the FIFOs with the data contained within the merge pattern controller. It then checks to see if the pattern bit count is greater than 16 (PBC>16B=1). If it is not, the controller outputs the signal (SHDIR=1) which tells the shift pattern PROM to shift the data left, and returns back to state 8 to load the rest of the data pattern. If the pattern bit count is greater than 16, the controller enables generated pattern latch 2 (/ENPL.2) and sets (SHDIR). It then moves to state 12 where the data will be loaded into the merge pattern controller.

State 12—In state 12, the coder controller loads the data from generated pattern latch 3 into the merge pattern controller. It then checks the signal sum bit count greater than 24 (SBC>24 ). If it is less than 24 (SBC>24=0), the controller returns back to state 8 and enables the output latches (/LTCHEN=0). If the sum bit count is greater than 24 (SBC>24=1), the controller will move to state 13 where it will output the signal (SHDIR) before loading the merge pattern controller with the rest of the data from generated pattern latch 3.

State 13—In state 13, the coder controller disables the output latches and enables the FIFO input latch to load the FIFOs with the data contained within the merge pattern controller. It then outputs the signal (SHDIR), which tells the shift pattern PROM to shift the data left, and returns back to state 8 to load the rest of the data pattern.

Figure 14:
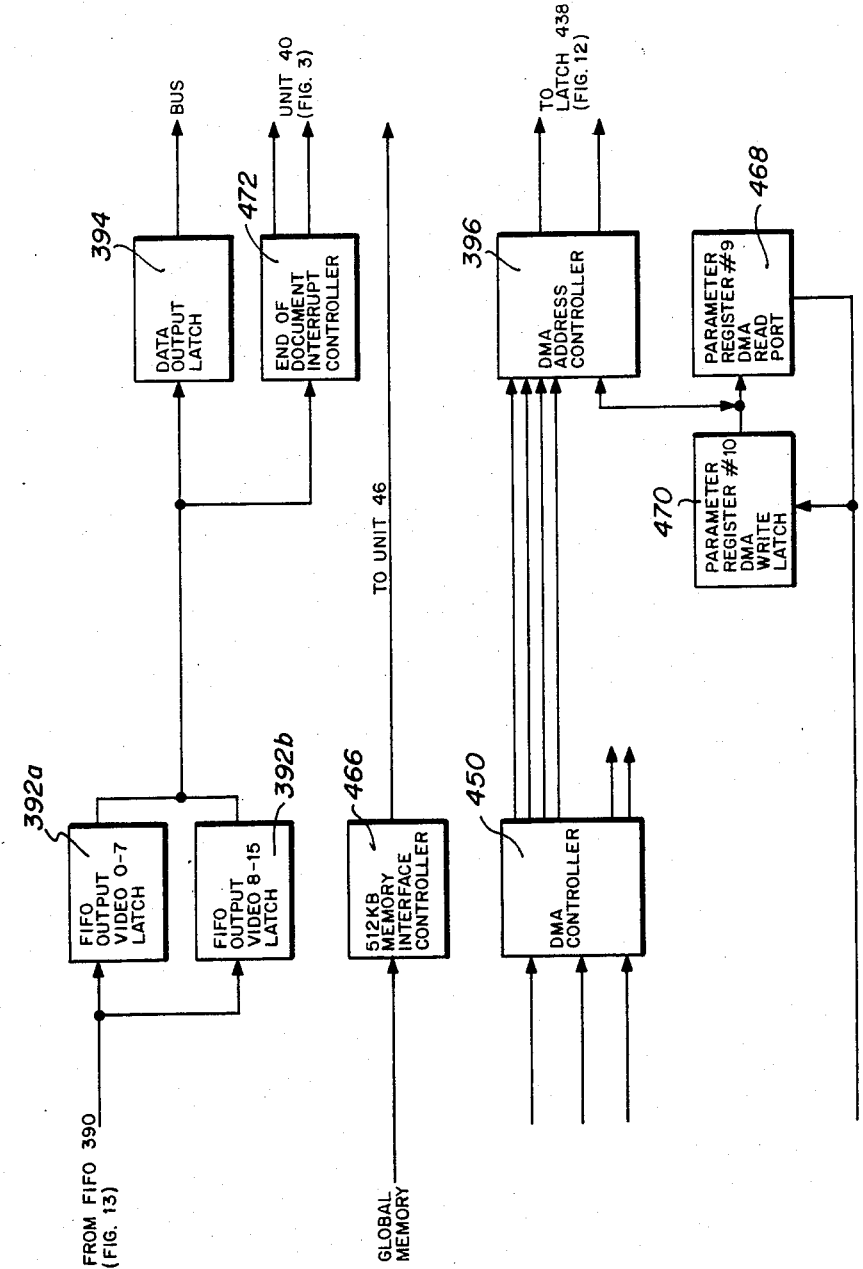

The pattern storage FIFOs 390 are made up of two 67401's. These FIFOs are arranged to yield a storage capacity of 8-by-64. The FIFOs receive data from the merge pattern controller 388 and output data to the FIFO output latches 392 (FIG. 14). The FIFOs act as temporary storage for the output controller. The FIFOs have two signals, input ready and output ready that are monitored by the coder controller 378 and the DMA controller 450 (FIG. 14), respectively. When the coder controller 378 is in state 0, 8, 10, or 12, it checks to see if the FIFOs are ready to accept data (IRDY=1). If they are ready, the controller will output the signal (SHRDYJ) which will set the FIFO input ready flip-flop, and on the next clock, will shift the data into the FIFOs. When the DMA controller 450 is in state 9, it checks to see if the FIFOs are ready to output data (ORDY=1). If they are ready, the controller will output the signal (FSOUT), and on the next clock, will shift the data out of the FIFOs.

Parameter register #8, blocks 452 and 454, is the FIFO memory output port 452 and the 512KB global memory input port 454. When the unit 46 is in the diagnostic mode, the data that is written to parameter register #8 will be written to the 512KB global memory. This provides a method of bypassing the FIFO memory and writing diagnostic data directly to the 512KB global memory. Reading from parameter register #8 will allow the diagnostics to read the data that is output from the FIFOs.

Parameter register #7, blocks 456 and 458, is the merge pattern controller output port 456 and the FIFO memory input port 458. When unit 46 is in the diagnostic mode, the data that is written to parameter register 7 will be written to the output FIFOs. This provides a method of bypassing the merge pattern controller and writing diagnostic data directly to the output FIFOs. Reading from parameter register #7 will allow the diagnostics to read the data that is output from the merge pattern controller.

Parameter register #6, block 460, is a read only port. This port allows reading the data that is output from the shift pattern PROM 386.

Parameter register #5, block 462, is a read only port. This port allows reading the input data to the coder controller 378.

Parameter register #4, block 464, is a read only port. This port allows reading the data that is output from the pattern generating latches 380, 382, 384.

Referring simultaneously to FIGS. 11 and 14, the output FIFO latches 392a, 392b convert the 8 bits of data received from the output FIFOs 390 into a 16 bit word for output to the global memory. The byte to word conversion starts when the output controller signals the DMA controller 450 that it is ready to output a word to the global memory. The DMA controller 450 then checks the status of the output FIFOs 390. If the FIFOs are ready to output data (ORDY=1), the DMA controller 450 selects the output latch 392a, 392b that contains the LSB of the output word 392a. The DMA controller 450 then removes the byte zero signal which selects the latch that contains the MSB of the output word 392b. The DMA controller 450 then signals the output controller that a word is ready for output, and the output controller then outputs the word to global memory.

The output controller 466 provides the interface signals that are necessary for data transfer between the VFUCM unit 46 and the global memory. The output controller starts out by signaling the DMA controller 450 that it is ready to output a word to global memory. Once the DMA controller 450 receives this signal, it converts the 8 bits of data from the output FIFOs into a 16-bit word. When the DMA controller has built the word, it signals the output controller that the word is ready for output. When write request is received by the output controller, the output cycle starts. The output controller checks to see if anyone is using the global memory bus. If not, it outputs a signal which enables this signal onto the bus. It then starts the cycle by sending address strobe and read/write. Address strobe is used by the memory unit to latch the address and the write signals onto the unit. One clock later, the controller removes address strobe and read/write, and sends data strobe. Data strobe is used to latch the data onto the memory unit. Once the data is latched, the memory unit responds by sending acknowledge back. When the output controller receives, it removes data strobe, and signals the DMA controller that it is ready to transfer another word to memory.

Before document processing begins, the application software must set up the DMA address controllers 396 (AM2940) with the operating mode, the global memory start address, and the maximum word count to be transferred. This process starts by writing the operating mode (usually mode 0) to parameter registers #9, block 468, and #10, block 470. Once the operating mode is latched into these registers, a command is sent to parameter register #0, block 438 (FIG. 12). This command is received by the DMA controller 450, which then outputs the code to the DMA address controllers 396 to load the data stored in parameter registers #9, block 468, and #10, block 470. The application software performs the same process to load the DMA address controllers 396 with the global memory starting address and the maximum word count. Once these parameters are loaded into the DMA address controllers, the software issues a command to enable the DMA address controllers' counters. The VFUCM unit 46 is now ready to start the compression process.

When the compressed data reaches the output FIFOs 390, the DMA controller 450 checks the output controller to see if it is ready to start outputting data to the global memory. If it is, the DMA controller outputs the signals to enable the FIFO output latch 392 which pertains to the LSB of the output word and the signal clocks the data into the latch. The controller then raises the signal to enable the next byte out of the FIFOs to be loaded into the FIFO output latch that pertains to the MSB of the output word. Now that the 16-bit word is ready to be output to the global memory, the DMA controller 450 signals the output controller that a word is ready for output by sending it a write request. The DMA controller then waits for the output controller to send another memory ready. Once received, the DMA controller starts building the next 16-bit word for output.

The data output latches 394 are used to disable the data lines when VFUCM unit 46 is not driving the output bus.

The interrupt controller 472 sends two types of interrupts to the video input unit 40. They are document complete and DMA word count equals zero. Before the compression process begins, the application software loads the maximum transfer word count into the DMA address controllers 396. During the compression process, if the maximum word count decrements to zero, the DMA address controllers send a signal to the interrupt controller and to the DMA controller. The DMA controller then stops the output process in order to preserve (not over-write) the data currently in memory. The interrupt controller then sends the signal word count equals zero (CMWCEQO) to the VFUIN unit 40 which will then interrupt the microcomputer 28. During the compression process, the interrupt controller also monitors the FIFO output data, checking for the end of document code (24 ones followed by 00 -binary).

Each time it encounters a byte of OFFH, it increments an internal counter. If the next byte is not a OFFH, it resets the counter to zero and waits for the next byte. The requirement of at least three consecutive bytes of OFFH must be satisfied before it will look for a OOH byte. Once the OOH byte is received, it sends the signal document complete interrupt to the VFUIN unit 40 and activates the FIFO clear signal to clear the FIFOs for the next document.

The DMA address controllers 396 consist of three 2940 address controllers. The three controllers are cascaded together to achieve an address range of 16 megabytes. The three internal registers select lines (I0, I1 and I2) are controlled by the DMA controller. Each time the application software needs to update one of these registers, it writes the data to parameter registers #9 and #10, then issues the command to write to the DMA address controller register via parameter register #0.

Parameter registers #9 and #10, blocks 468 and 470, are used to read and write data exclusively to the DMA address controllers 396. These two registers form a 24-bit data bus (eight bits to each controller). These registers operate the same online as they do in diagnostics. To write to the DMA address controllers, data must first be written into both parameter registers #9 and #10, then the command to load this data into the DMA's registers must be sent to parameter register #0. To read data back from the DMA address controllers' registers, the command to read a certain register is sent to parameter register #0, then the data is available to be read back through parameter registers #9 and #10.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A video filter for use in an image processing system having a video input, a video correlator, and a video compressor, comprising:
    means for receiving two cells of video data from the video correlator at one time;
    means for widening said two cells of received video data into four cells of data comprising black cells and white cells; and
    means for filtering said four cells of data by determining whether there is a minimum density of said black cells or said white cells.

2. A video filter for use in an image processing system having a video input, a video correlator, and a video compressor, comprising:
    first memory means for stroking video data comprising white cells and black cells representative of a document scanned by said video input;
    means for extracting a portion of said video data stored in said first memory representing an image portion of said document;
    second memory means for storing said extracted portion of said video data; and
    means for filtering said extracted portion of said video data by determining whether there is a minimum density of said black cells or said white cells.

3. The video filter of claim 2, further comprising:
    means for reading said second memory means containing video data representing an image portion of a first document while storing video data representative of a second document into said first memory means;
    a video memory; and
    means for widening said filtered video data into eight-bit bytes for storage in said video memory.

* * * * *